United States Patent
Tsutsumi et al.

(10) Patent No.: US 9,850,325 B2
(45) Date of Patent: Dec. 26, 2017

(54) METHOD FOR PRODUCING RING-OPENING METATHESIS POLYMER HYDRIDE, AND RESIN COMPOSITION

(71) Applicant: ZEON CORPORATION, Tokyo (JP)

(72) Inventors: Takashi Tsutsumi, Tokyo (JP); Kazunori Taguchi, Tokyo (JP); Yumi Ohsaku, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 14/385,582

(22) PCT Filed: Mar. 14, 2013

(86) PCT No.: PCT/JP2013/057217
§ 371 (c)(1),
(2) Date: Sep. 16, 2014

(87) PCT Pub. No.: WO2013/137398
PCT Pub. Date: Sep. 19, 2013

(65) Prior Publication Data
US 2015/0051353 A1 Feb. 19, 2015

(30) Foreign Application Priority Data

| Mar. 16, 2012 | (JP) | 2012-060138 |
| Sep. 28, 2012 | (JP) | 2012-218199 |
| Sep. 28, 2012 | (JP) | 2012-218200 |
| Sep. 28, 2012 | (JP) | 2012-218201 |
| Jan. 16, 2013 | (JP) | 2013-005154 |

(51) Int. Cl.
*C08F 8/04* (2006.01)
*C08G 61/08* (2006.01)
*C08L 65/00* (2006.01)

(52) U.S. Cl.
CPC ............... *C08F 8/04* (2013.01); *C08G 61/08* (2013.01); *C08L 65/00* (2013.01); *C08G 2261/418* (2013.01); *C08G 2261/65* (2013.01); *C08G 2261/724* (2013.01); *C08G 2261/92* (2013.01); *C08G 2261/95* (2013.01)

(58) Field of Classification Search
None
See application file for complete search history.

(56) References Cited

U.S. PATENT DOCUMENTS

| 5,064,919 A * | 11/1991 | Hara ............. C08G 61/08 526/142 |
| 2002/0107138 A1 | 8/2002 | Hoveyda et al. |
| 2002/0107438 A1 | 8/2002 | Liu et al. |
| 2003/0100783 A1* | 5/2003 | Grubbs ............ C08F 8/04 556/136 |
| 2003/0166955 A1 | 9/2003 | Pederson et al. |
| 2003/0212233 A1 | 11/2003 | Angeletakis et al. |
| 2003/0220512 A1 | 11/2003 | Blechert |
| 2005/0049417 A1 | 3/2005 | Arlt |
| 2005/0143580 A1 | 6/2005 | Arlt |
| 2005/0272598 A1 | 12/2005 | Hoveyda et al. |
| 2007/0043180 A1 | 2/2007 | Zhan |
| 2009/0215974 A1 | 8/2009 | Sunaga et al. |
| 2010/0041844 A1 | 2/2010 | Zhan |
| 2010/0113795 A1 | 5/2010 | Arlt et al. |
| 2010/0292486 A1 | 11/2010 | Hoveyda et al. |
| 2012/0016093 A1 | 1/2012 | Zhan |
| 2013/0041122 A1* | 2/2013 | Holtcamp ........... C08F 32/08 526/171 |

FOREIGN PATENT DOCUMENTS

| JP | A-10-195182 | 7/1998 |
| JP | A-2001-240658 | 9/2001 |
| JP | A-2004-506755 | 3/2004 |
| JP | A-2005-501936 | 1/2005 |
| JP | A-2005-524733 | 8/2005 |
| JP | A-2007-501199 | 1/2007 |
| JP | A-2007-534640 | 11/2007 |
| JP | A-2008-546846 | 12/2008 |
| JP | A-2010-503713 | 2/2010 |
| WO | WO 2008/010317 A1 | 1/2008 |
| WO | WO 2012/013208 A1 | 2/2012 |
| WO | 2012/133617 A1 | 10/2012 |

(Continued)

OTHER PUBLICATIONS

Aug. 10, 2015 Extended European Search Report issued in Application No. 13760785.9.

(Continued)

*Primary Examiner* — Robert C Boyle
(74) *Attorney, Agent, or Firm* — Oliff PLC

(57) ABSTRACT

A method for producing a hydrogenated ring-opening metathesis polymer includes subjecting a cyclic olefin to ring-opening metathesis polymerization in the presence of a polymerization catalyst to produce a ring-opening metathesis polymer, and hydrogenating at least some of carbon-carbon double bonds of the ring-opening metathesis polymer, at least one ruthenium compound selected from a group made of a ruthenium compound represented by a formula (I), (II), (III), and (IV) being used as the polymerization catalyst; and a resin composition having a hydrogenated ring-opening metathesis polymer produced by this method. It is possible to industrially advantageously produce a hydrogenated ring-opening metathesis polymer that exhibits especially excellent light transmittance.

9 Claims, No Drawings

(56) References Cited

FOREIGN PATENT DOCUMENTS

WO     2013025284 A1    2/2013
WO     2013/081726 A1    6/2013

OTHER PUBLICATIONS

Louie et al., "Metathesis of Electron-Rich Olefins: Structure and Reactivity of Electron-Rich Carbene Complexes," *Organometallics*, 2002, vol. 21, pp. 2153-2164.
May 14, 2013 International Search Report issued in International Application No. PCT/JP2013/057217.

\* cited by examiner

METHOD FOR PRODUCING RING-OPENING METATHESIS POLYMER HYDRIDE, AND RESIN COMPOSITION

TECHNICAL FIELD

The invention relates to a method for producing a hydrogenated ring-opening metathesis polymer that is useful as a material for forming a pixel separation film and a planarization film of an organic electroluminescence (EL) device, a gate insulating film and a protective film of a thin film transistor (TFT), and the like, and a resin composition that includes the hydrogenated ring-opening metathesis polymer.

BACKGROUND ART

A cyclic olefin ring-opening metathesis polymerization method that utilizes a transition metal compound as a catalyst has been well known in the art. W and Mo that belong to Group 6 in the periodic table, Nb, Ta, Re, Zr, Ti, Ru, Os, Ir, and the like have been known as the center metal of the metathesis catalyst. In particular, since a catalyst system that includes ruthenium is not easily affected by a catalyst deactivation component such as water and an alcohol, an improvement in the catalyst system that includes ruthenium has been extensively studied in recent years.

For example, Patent Document 1 discloses a method that subjects a cyclic olefin to ring-opening metathesis polymerization using a ruthenium benzylidene compound in which two neutral electron donors such as triphenylphosphine or tricyclohexylphosphine are coordinated as ligands, adds a modifier to the polymerization solution to terminate polymerization, and hydrogenates the ring-opening cyclic olefin polymer under hydrogen pressure.

Patent Document 2 discloses a method for producing a hydrogenated ring-opening metathesis polymer wherein a cyclic olefin is subjected to ring-opening metathesis polymerization using a ruthenium carbene complex in which at least one heteroatom-containing carbene compound is coordinated to ruthenium as a metathesis polymerization catalyst, and at least some of the carbon-carbon double bonds of the resulting ring-opening metathesis polymer are hydrogenated. Patent Document 2 discloses a ruthenium compound represented by the following formula (a) and a ruthenium compound represented by the following formula (b) as the ruthenium carbene complex.

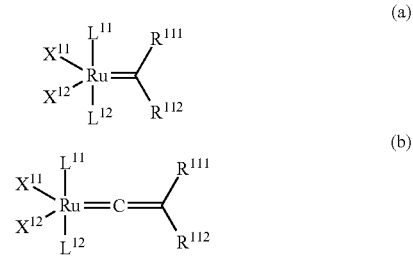

wherein $R^{111}$ and $R^{112}$ are a hydrogen atom, a $C_1$-$C_{20}$ hydrocarbon group, or the like, $X^{11}$ and $X^{12}$ are an arbitrary anionic ligand, $L^{11}$ is a heteroatom-containing carbene compound, and $L^{12}$ is a heteroatom-containing carbene compound, an arbitrary neutral electron donor compound, or the like.

Since the hydrogenated ring-opening cyclic olefin polymers disclosed in Patent Documents 1 and 2 exhibit excellent transparency, electrical properties, and the like, the hydrogenated ring-opening cyclic olefin polymers are useful as an electrical insulating material for forming a pixel separation film and a planarization film of an organic electroluminescence (EL) device, a gate insulating film and a protective film of a thin film transistor (TFT), and the like.

However, an electrical insulating material that exhibits more excellent transparency and electrical properties has been desired along with the recent development of science and technology.

Patent Document 3 discloses that a ruthenium compound having a structure similar to those used in connection with the invention is useful as a metathesis polymerization catalyst.

RELATED-ART DOCUMENT

Patent Document

Patent Document 1: JP-A-10-195182
Patent Document 2: JP-A-2001-240658
Patent Document 3: JP-T-2008-546846 (US2007/0043180)

SUMMARY OF THE INVENTION

Technical Problem

The invention was conceived in view of the above situation. An object of the invention is to provide a method for industrially advantageously producing a hydrogenated ring-opening metathesis polymer that exhibits excellent light transmittance, and a resin composition that includes a hydrogenated ring-opening metathesis polymer produced using the method.

Solution to Problem

The inventors of the invention conducted extensive studies in order to achieve the above object. As a result, the inventors found that (a) a ring-opening cyclic olefin polymer can be obtained in high yield by utilizing a ruthenium compound having a structure similar to that of the ruthenium compound disclosed in Patent Document 3 as a cyclic olefin metathesis polymerization catalyst, and (b) a hydrogenated ring-opening metathesis polymer obtained by hydrogenating the resulting ring-opening cyclic olefin polymer exhibits excellent light transmittance as compared with a hydrogenated ring-opening metathesis polymer obtained by subjecting a cyclic olefin to metathesis polymerization using a known ruthenium compound as a metathesis polymerization catalyst, and hydrogenating the resulting ring-opening polymer, and is suitable as a material for forming a pixel separation film and a planarization film of an organic electroluminescence (EL) device, a gate insulating film and a protective film of a thin film transistor (TFT), and the like. These findings have led to the completion of the invention.

Several aspects of the invention provide the following method for producing a hydrogenated ring-opening metathesis polymer (see [1] to [13]), and resin composition (see [14]).

[1] A method for producing a hydrogenated ring-opening metathesis polymer including subjecting a cyclic olefin to ring-opening metathesis polymerization in the presence of a polymerization catalyst to produce a ring-opening metathesis polymer, and hydrogenating at least some of the carbon-carbon double bonds of the ring-opening metathesis polymer, at least one ruthenium compound selected from the group consisting of a ruthenium compound represented by a formula (I), a ruthenium compound represented by a formula (II), a ruthenium compound represented by a formula (III), and a ruthenium compound represented by a formula (IV) being used as the polymerization catalyst,

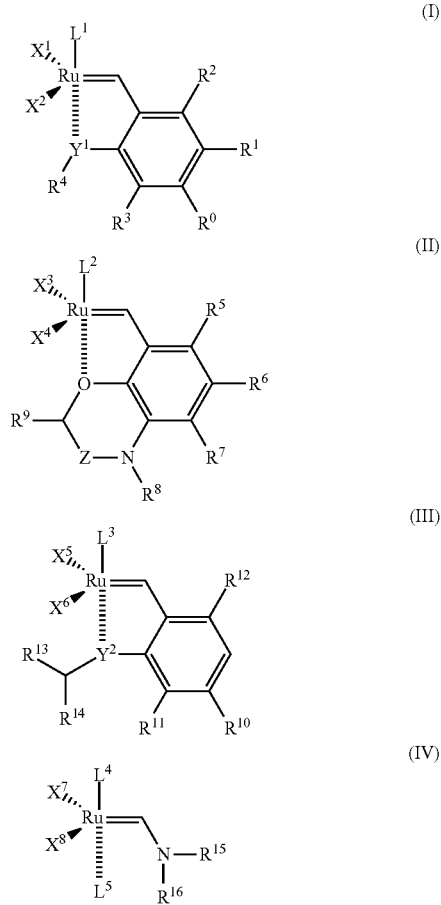

wherein $X^1$ to $X^8$ are independently a halogen atom or a group represented by —O—(C=O)—$R^a$, $R^a$ is a substituted or unsubstituted $C_1$-$C_{20}$ alkyl group, $L^1$ to $L^5$ are independently an electron-donating ligand, $R^0$ is a hydrogen atom, a halogen atom, a nitro group, a cyano group, a $C_1$-$C_{20}$ alkyl group, a $C_1$-$C_{20}$ alkoxy group, a $C_1$-$C_{20}$ alkylthio group, a tri-$C_1$-$C_{20}$ alkylsilyl group, a tri-$C_1$-$C_{20}$ alkylsilyloxy group, a substituted or unsubstituted $C_6$-$C_{20}$ aryl group, a substituted or unsubstituted $C_6$-$C_{20}$ aryloxy group, a substituted or unsubstituted $C_2$-$C_{20}$ heterocyclic group, a $C_1$-$C_{20}$ alkylsulfonyl group, a $C_1$-$C_{20}$ alkylsulfinyl group, a formyl group, a $C_1$-$C_{20}$ alkylcarbonyl group, a $C_1$-$C_{20}$ alkoxycarbonyl group, a di-$C_1$-$C_{20}$ alkylcarbamoyl group, a di-$C_1$-$C_{20}$ alkylureido group, or a $C_1$-$C_{20}$ alkylsulfonylamino group, $R^1$ is a group represented by $(R^{b1})(R^{b2})NSO_2$—, a formyl group, a $C_1$-$C_{20}$ alkylcarbonyl group, a $C_1$-$C_{20}$ alkoxycarbonyl group, a group represented by $(R^{c1})(R^{c2})NCO$—, a amide group, a halogen atom, a di-$C_1$-$C_{20}$ alkylureido group, or a $C_1$-$C_{20}$ alkylsulfonylamino group, $R^{b1}$ and $R^{c1}$ are a hydrogen atom, a $C_1$-$C_{20}$ alkyl group, or a substituted or unsubstituted aryl group, $R^{b2}$ and $R^{c2}$ are a hydrogen atom, a $C_1$-$C_{20}$ alkyl group, a substituted or unsubstituted aryl group, or a group represented by G-D- (wherein D is a linking group, and G is a polymer main chain), provided that $R^{b1}$ and $R^{b2}$ or $R^{c1}$ and $R^{c2}$ optionally bond to each other to form a ring, $R^2$, $R^3$, $R^5$, $R^6$, $R^7$, $R^{10}$, $R^{11}$, and $R^{12}$ are independently a hydrogen atom, a halogen atom, a $C_1$-$C_{20}$ alkyl group, a $C_1$-$C_{20}$ alkoxy group, a $C_1$-$C_{20}$ alkylthio group, a tri-$C_1$-$C_{20}$ alkylsilyloxy group, a substituted or unsubstituted $C_6$-$C_{20}$ aryl group, a substituted or unsubstituted $C_6$-$C_{20}$ aryloxy group, a substituted or unsubstituted $C_2$-$C_{20}$ heterocyclic group, a $C_1$-$C_{20}$ alkoxycarbonyl group, a di-$C_1$-$C_{20}$ alkylcarbamoyl group, a di-$C_1$-$C_{20}$ alkylureido group, or a $C_1$-$C_{20}$ alkylsulfonylamino group, $R^4$, $R^8$, $R^9$, $R^{13}$, $R^{14}$, $R^{15}$, and $R^{16}$ are independently a hydrogen atom, a $C_1$-$C_{20}$ alkyl group, a $C_1$-$C_{20}$ alkoxy group, a $C_1$-$C_{20}$ alkylthio group, a tri-$C_1$-$C_{20}$ alkylsilyl group, a tri-$C_1$-$C_{20}$ alkylsilyloxy group, a substituted or unsubstituted $C_6$-$C_{20}$ aryl group, a substituted or unsubstituted $C_6$-$C_{20}$ aryloxy group, a substituted or unsubstituted $C_2$-$C_{20}$ heterocyclic group, a $C_1$-$C_{20}$ alkylsulfonyl group, a $C_1$-$C_{20}$ alkylsulfinyl group, a $C_1$-$C_{20}$ alkylcarbonyl group, a $C_1$-$C_{20}$ alkoxycarbonyl group, a di-$C_1$-$C_{20}$ alkylcarbamoyl group, a di-$C_1$-$C_{20}$ alkylureido group, a $C_1$-$C_{20}$ alkylsulfonylamino group, or a $C_6$-$C_{20}$ arylcarbonyl group that is optionally substituted with a halogen atom.

$Y^1$ and $Y^2$ are independently an oxygen atom, a sulfur atom, $NR^b$, or $PR^b$, $R^b$ is a hydrogen atom or a $C_1$-$C_{20}$ alkyl group, and Z is a group represented by —$C(R^b)(R^c)$— (wherein $R^b$ and $R^c$ are independently a hydrogen atom, a $C_1$-$C_6$ alkyl group, or a halo-$C_1$-$C_6$ alkyl group), or a carbonyl group.

[2] The method according to [1], wherein at least 98% of the carbon-carbon double bonds of the ring-opening metathesis polymer are hydrogenated.

[3] The method according to [1] or [2], wherein $L^1$ to $L^5$ in the formulas (I), (II), (III), and (IV) are a compound represented by a formula (1-1), a compound represented by a formula (1-2), or a compound represented by a formula (1-3),

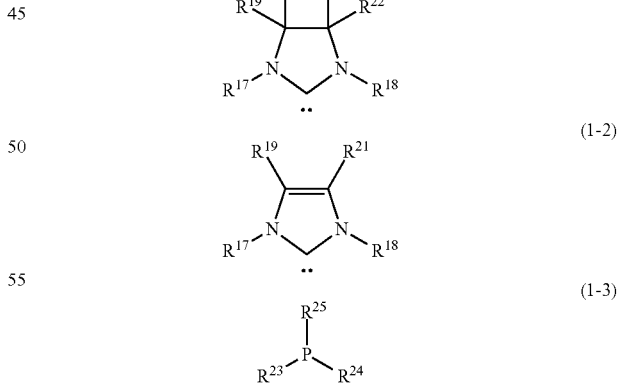

wherein $R^{17}$ and $R^{18}$ are independently a hydrogen atom, or a $C_1$-$C_{20}$ hydrocarbon group that optionally includes a halogen atom, an oxygen atom, a nitrogen atom, a sulfur atom, a phosphorus atom, and/or a silicon atom, $R^{19}$ to $R^{22}$ are independently a hydrogen atom, or a $C_1$-$C_{10}$ alkyl group, and $R^{23}$ to $R^{25}$ are independently a $C_1$-$C_{20}$ alkyl group, a $C_1$-$C_{20}$ alkoxy group, a $C_3$-$C_{20}$ cycloalkyl group, a substituted or unsubstituted $C_6$-$C_{20}$ aryl group, a substituted or unsubstituted $C_6$-$C_{20}$ aryloxy group, or a substituted or unsubstituted $C_2$-$C_{20}$ heterocyclic group.

[4] The method according to any one of [1] to [3], wherein the ruthenium compound represented by the formula (I) is a compound represented by a formula (I-1),

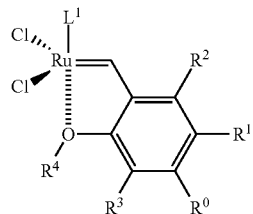

(I-1)

wherein $L^1$ and $R^0$ to $R^4$ are the same as defined above.

[5] The method according to any one of [1] to [3], wherein the ruthenium compound represented by the formula (I) is a compound represented by a formula (I-2),

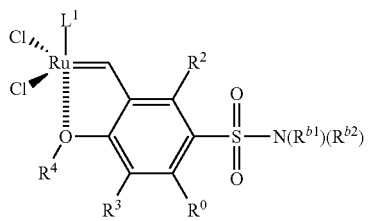

(I-2)

wherein $L^1$, $R^0$, $R^2$ to $R^4$, $R^{b1}$, and $R^{b2}$ are the same as defined above.

[6] The method according to any one of [1] to [3], wherein the ruthenium compound represented by the formula (I) is a compound represented by a formula (I-3),

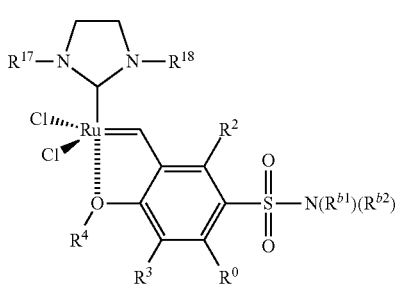

(I-3)

wherein $R^0$, $R^2$ to $R^4$, $R^{17}$, $R^{18}$, $R^{b1}$, and $R^{b2}$ are the same as defined above.

[7] The method according to any one of [1] to [3], wherein the ruthenium compound represented by the formula (I) is a compound represented by a formula (I-4),

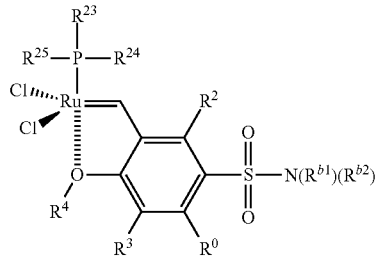

(I-4)

wherein $R^0$, $R^2$ to $R^4$, $R^{23}$ to $R^{25}$, $R^{b1}$, and $R^{b2}$ are the same as defined above.

[8] The method according to any one of [1] to [3], wherein the ruthenium compound represented by the formula (II) is a compound represented by a formula (II-1).

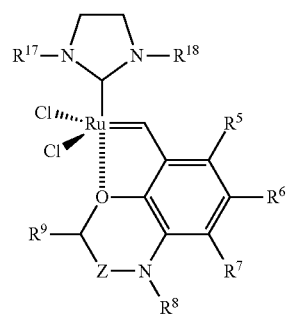

(II-1)

wherein $R^5$ to $R^9$, $R^{17}$, $R^{18}$, and Z are the same as defined above.

[9] The method according to any one of [1] to [3], wherein the ruthenium compound represented by the formula (II) is a compound represented by a formula (II-2),

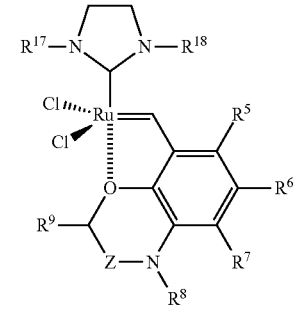

(II-2)

wherein $R^8$, $R^9$, $R^{17}$, and $R^{18}$ are the same as defined above.

[10] The method according to any one of [1] to [3], wherein the ruthenium compound represented by the formula (III) is a compound represented by the formula (III) wherein $Y^2$ is an oxygen atom.

[11] The method according to any one of [1] to [3], wherein the ruthenium compound represented by the formula (III) is a compound represented by a formula (III-2), (III-2)

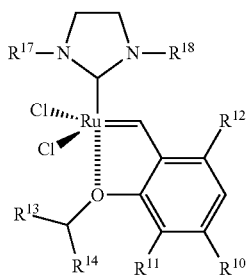

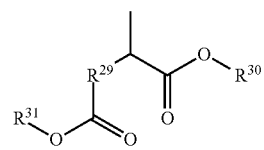

(3)

wherein $R^{29}$ is a $C_1$-$C_3$ alkylene group, and $R^{30}$ and $R^{31}$ are independently a $C_1$-$C_{10}$ alkyl group or a $C_1$-$C_{10}$ alkyl halide group.

[14] A resin composition including a hydrogenated ring-opening metathesis polymer produced by the method according to any one of [1] to [13].

wherein $R^{10}$ to $R^{14}$, $R^{17}$, and $R^{18}$ are the same as defined above.

[12] The method according to any one of [1] to [3], wherein the ruthenium compound represented by the formula (IV) is a compound represented by a formula (IV-1),

Advantageous Effects of the Invention

According to one aspect of the invention, it is possible to industrially advantageously produce a hydrogenated ring-opening metathesis polymer that exhibits excellent light transmittance, relative permittivity, chemical resistance, and plasma resistance. The hydrogenated ring-opening metathesis polymer can suitably be used as a material for forming a pixel separation film and a planarization film of an organic EL device, a gate insulating film and a protective film of a TFT, and the like.

DESCRIPTION OF EMBODIMENTS

A method for producing a hydrogenated ring-opening metathesis polymer and a resin composition according to several exemplary embodiments of the invention are described in detail below.

1) Method for Producing Hydrogenated Ring-Opening Metathesis Polymer

A method for producing a hydrogenated ring-opening metathesis polymer according to one embodiment of the invention (hereinafter may be referred to as "production method according to one embodiment of the invention") includes subjecting a cyclic olefin to ring-opening metathesis polymerization in the presence of a polymerization catalyst to produce a ring-opening metathesis polymer, and hydrogenating at least some of the carbon-carbon double bonds of the ring-opening metathesis polymer, at least one ruthenium compound selected from the group consisting of the ruthenium compound represented by the formula (I), the ruthenium compound represented by the formula (II), the ruthenium compound represented by the formula (III), and the ruthenium compound represented by the formula (IV) being used as the polymerization catalyst.

(IV-1)

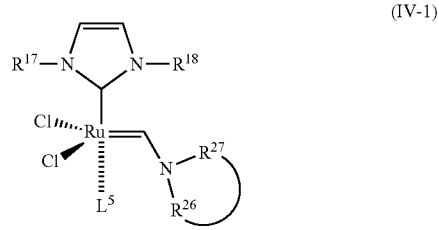

wherein $R^{17}$, $R^{18}$, and $L^5$ are the same as defined above, and

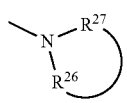

the group represented by the above formula is a nitrogen-containing heterocyclic group that is bonded through the nitrogen atom.

[13] The method according to any one of [1] to [3], wherein the cyclic olefin includes at least a monomer represented by a formula (2), (2)

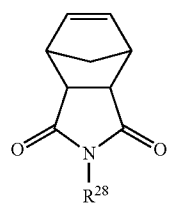

wherein $R^{28}$ is a $C_1$-$C_{20}$ alkyl group, a $C_3$-$C_{20}$ cycloalkyl group, a substituted or unsubstituted $C_6$-$C_{20}$ aryl group, or a group represented by a formula (3), (1) Cyclic Olefin In the production method according to one embodiment of the invention, the cyclic olefin (monomer) is subjected to ring-opening metathesis polymerization. Examples of the cyclic olefin include (i) polycyclic olefins that include a norbornene ring, such as norbornene (bicyclo[2.2.1]hept-2-ene), dicyclopentadienes, and tetracyclododecenes, (ii) monocyclic olefins, (iii) cyclic diolefins, and the like.

These cyclic olefins may be substituted with a substituent, and may include an additional double bond other than the double bond of the norbornene ring. Examples of the substituent include an alkyl group, an alkenyl group, an alkylidene group, a polar group, and the like.

Among these, the polycyclic olefins (i) are preferable, cyclic olefins having 3 to 6 rings and including a norbornene ring are more preferable, and cyclic olefins having 3 rings such as dicyclopentadienes and cyclic olefins having 4 rings such as tetracyclododecenes are still more preferable, since a hydrogenated ring-opening metathesis polymer that exhibits excellent heat resistance and solubility can be obtained.

Specific examples of the dicyclopentadienes include dicyclopentadiene, methyldicyclopentadiene, tricyclo[5.2.1.0$^{2.6}$]dec-8-ene, and the like.

Specific examples of the tetracyclododecenes include:

(a) tetracyclododecenes that, do not include an additional double bond other than the double bond of the norbornene ring, such as tetracyclo[6.2.1.1$^{3.6}$]dec-4-ene, 9-methyltetracyclo[6.2.1.1$^{3.6}$.0$^{2.7}$]dodec-4-ene, 9-ethyltetracyclo[6.2.1.1$^{3.6}$.0$^{2.7}$]dodec-4-ene, 9-cyclohexyltetracyclo[6.2.1.1$^{3.6}$.0$^{2.7}$]dodec-4-ene, and 9-cyclopentyltetracyclo[6.2.1.1$^{3.6}$.0$^{2.7}$]dodec-4-ene, and compounds obtained by substituting these tetracyclododecenes with a substituent;

(b) tetracyclododecenes that include an additional double bond other than the double bond of the norbornene ring, such as 9-methylidenetetracyclo[6.2.1.1$^{3.6}$.0$^{2.7}$]dodec-4-ene, 9-ethylidenetetracyclo[6.2.1.1$^{3.6}$.0$^{2.7}$]dodec-4-ene, 9-vinyltetracyclo[6.2.1.1$^{3.6}$.0$^{2.7}$]dodec-4-ene, 9-propenyltetracyclo[6.2.1.1$^{3.6}$.0$^{2.7}$]dodec-4-ene, 9-cyclohexenyltetracyclo[6.2.1.1$^{3.6}$.0$^{2.7}$]dodec-4-ene, and 9-cyclopentenyltetracyclo[6.2.1.1$^{3.6}$.0$^{2.7}$]dodec-4-ene;

(c) tetracyclododecenes that include an aromatic ring, such as 9-phenyltetracyclo[6.2.1.1$^{3.6}$.0$^{2.7}$]dodec-4-ene;

(d) tetracyclododecenes that include a polar group, such as tetracyclododecenes that include a carboxyl group, such as 4-hydroxycarbonyltetracyclo[6.2.1.1$^{3.6}$.0$^{2.7}$]dodec-9-ene, 4-methyl-4-hydroxycarbonyltetracyclo[6.2.1.1$^{3.6}$.0$^{2.7}$]dodec-9-ene, 4-carboxymethyl-4-hydroxycarbonyltetracyclo[6.2.1.1$^{3.6}$.0$^{2.7}$]dodec-9-ene, and 4-exo-5-endo-4,5-dihydroxycarbonyltetracyclo[6.2.1.1$^{3.6}$.0$^{2.7}$]dodec-9-ene; tetracyclododecenes that include an acid anhydride group, such as tetracyclo[6.2.1.1$^{3.6}$.0$^{2.7}$]dodec-9-ene-4,5-dicarboxylic anhydride; tetracyclododecenes that include a substituent including a nitrogen atom, such as 4-methoxycarbonyltetracyclo[6.2.1.1$^{3.6}$.0$^{2.7}$]dodec-9-ene, 4-methyl-4-methoxycarbonyltetracyclo[6.2.1.1$^{3.6}$.0$^{2.7}$]dodec-9-ene, 4-hydroxymethyltetracyclo[6.2.1.1$^{3.6}$.0$^{2.7}$]dodec-9-ene, 4-cyanotetracyclo[6.2.1.1$^{3.6}$.0$^{2.7}$]dodec-9-ene, 4-diethylaminotetracyclo[6.2.1.1$^{3.6}$.0$^{2.7}$]dodec-9-ene, 4-dimethylaminotetracyclo[6.2.1.1$^{3.6}$.0$^{2.7}$]dodec-9-ene, 4-phenylsulfonyltetracyclo[6.2.1.1$^{3.6}$.0$^{2.7}$]dodec-9-ene, and tetracyclo[6.2.1.1$^{3.6}$.0$^{2.7}$]dodec-9-ene-4,5-dicarboxyimide; tetracyclododecenes that include a substituent including a halogen atom, such as 9-chlorotetracyclo[6.2.1.1$^{3.6}$.0$^{2.7}$]dodec-4-ene; and tetracyclododecenes that include a substituent including a silicon atom, such as 9-trimethylsilyltetracyclo[6.2.1.1$^{3.6}$.0$^{2.7}$]dodec-4-ene.

In the production method according to one embodiment of the invention, a cyclic olefin that includes a norbornene ring other than those mentioned above (hereinafter referred to as "additional cyclic olefin that includes a norbornene ring") may also be used.

Examples of the additional cyclic olefin that includes a norbornene ring include:

(e) cyclic olefins that include one norbornene ring, such as norbornenes such as norbornene, 5-methylnorbornene, 5-ethylnorbornene, 5-n-butylnorbornene, 5-n-hexylnorbornene, 5-n-decylnorbornene, 5-cyclohexylnorbornene, and 5-cyclopentylnorbornene, and oxanorbornenes corresponding to these norbornenes; and norbornenes that include a double bond outside the norbornene ring, such as 5-ethylidenenorbornene, 5-vinylnorbornene, 5-propenylnorbornene, 5-cyclohexenylnorbornene, and 5-cyclopentenylnorbornene, and oxanorbornenes corresponding to these norbornenes;

(f) cyclic olefins that include one norbornene ring and one six-membered ring, such as hexacycloheptadecenes such as hexacycloheptadecene, 12-methylhexacycloheptadecene, 12-ethylhexacycloheptadecene, 12-n-butylhexacycloheptadecene, 12-n-hexylhexacycloheptadecene, 12-n-deceylhexacycloheptadecene, 12-cyclohexylhexacycloheptadecene, 12-cyclopentylhexacycloheptadecene, 12-ethylidenehexacycloheptadecene, 12-vinylhexacycloheptadecene, 12-propenylhexacycloheptadecene, 12-cyclohexenylhexacycloheptadecene, and 12-cyclopentenylhexacycloheptadecene;

(g) cyclic olefins that include a norbornene ring and an aromatic ring, such as 5-phenylnorbornene, 5-phenyloxanorbornene, 1,4-methano-1,4,4a,9a-tetrahydrofluorene, and 1,4-methano-1,4,4a,5,10,10a-hexahydroanthracene; and (h) cyclic olefins that include a polar group, such as norbornenes that include a polar group including an oxygen atom, such as 5-methoxycarbonylnorbornene, 5-ethoxycarbonylnorbornene, 5-methyl-5-methoxycarbonylnorbornene, 5-methyl-5-ethoxycarbonylnorbornene, norbornenyl-2-methyl propionate, norbornenyl-2-methyl octanate, norbornene-5,6-dicarboxylic anhydride, 5-hydroxymethylnorbornene, 5,6-di(hydroxymethyl)norbornene, 5,5-di(hydroxymethyl)norbornene, 5-hydroxy-isopropylnorbornene, 5-carboxynorbornene, 5-methyl-5-carboxynorbornene, 5,6-dicarboxynorbornene, and 5-methoxycarbonyl-6-carboxynorbornene;

oxanorbornenes that include a polar group including an oxygen atom, such as 5-methoxycarbonyloxanorbornene, 5-ethoxycarbonyloxanorbornene, 5-methyl-5-methoxycarbonyloxanorbornene, 5-methyl-5-ethoxycarbonyloxanorbornene, oxanorbornenyl-2-methyl propionate, oxanorbornenyl-2-methyl octanate, oxanorbornene-5,6-dicarboxylic anhydride, 5-hydroxymethyloxanorbornene, 5,6-di(hydroxymethyl)oxanorbornene, 5,5-di(hydroxymethyl)oxanorbornene, 5-hydroxy-isopropyloxanorbornene, 5-carboxyoxanorbornene, 5-methyl-5-cearboxyoxanorbornene, 5,6-dicarboxyoxanorbornene, and 5-methoxycarbonyl-6-carboxyoxanorbornene;

norbornenes that include a polar group including a nitrogen atom, such as 5-cyanonorbornene and norbornene-5,6-dicarboxylic acid imide; and oxanorbornenes that include a polar group including a nitrogen, atom, such as 5-cyanooxanorbornene and oxanorbornene-5,6-dicarboxylic acid imide.

Examples of the monocyclic olefins (ii) and the cyclic diolefins (iii) include $C_4$-$C_{20}$ (preferably $C_4$-$C_{10}$) cyclic olefins, $C_4$-$C_{20}$ (preferably $C_4$-$C_{10}$) cyclic diolefins, and derivatives thereof. Specific examples of the monocyclic olefins (ii) and the cyclic diolefins (iii) include monocyclic olefin-based monomers such as cyclobutene, cyclopentene, methylcyclopentene, cyclohexene, methylcyclohexene, cycloheptene, and cyclooctene (see JP-A-64-66216, for example); and cyclic diolefin-based monomers such as cyclohexadiene, methylcyclohexadiene, cyclooctadiene, methylcyclooctadiene, and phenylcyclooctadiene (see JP-A-7-258318, for example).

It is preferable to use a cyclic olefin that includes the compound represented by the formula (2) (hereinafter may be referred to as "compound (2)") since the object of the invention can be easily achieved.

$R^{28}$ in the formula (2) is a $C_1$-$C_{20}$ alkyl group, a $C_3$-$C_{20}$ cycloalkyl group, a substituted or unsubstituted $C_6$-$C_{20}$ aryl group, or the group represented by the formula (3).

Examples of the $C_1$-$C_{20}$ alkyl group represented by $R^{28}$ include a methyl group, an ethyl group, a propyl group, an isopropyl group, an n-butyl group, an isobutyl group, a sec-butyl group, a t-butyl group, an n-pentyl group, an isopentyl group, a hexyl group, a heptyl group, an octyl group, a nonyl group, a decyl group, an eicosyl group, a heneieosyl group, a docosyl group, a 1-methylhexyl group, a 1-ethylhexyl group, a 2-methylhexyl group, a 2-ethylhexyl group, a 1-methylheptyl group, a 2-ethylheptyl group, and the like.

Examples of the $C_3$-$C_{20}$ cycloalkyl group include a cyclopropyl group, a cyclobutyl group, a cyclopentyl group, a cyclohexyl group, a cycloheptyl group, and the like.

Examples of the $C_6$-$C_{20}$ aryl group include a phenyl group, a tolyl group, a xylyl group, a 2,4,6-trimethylphenyl group, and the like.

Examples of a substituent that may substitute the $C_6$-$C_{20}$ aryl group include $C_1$-$C_6$ alkyl groups such as a methyl group and an ethyl group; $C_1$-$C_6$ alkoxy groups such as a methoxy group and an ethoxy group; halogen atoms such as a fluorine atom and a chlorine atom; a nitro group; a cyano group; and the like.

$R^{29}$ in the formula (3) is a $C_1$-$C_3$ alkylene group (e.g., methylene group, ethylene group, or trimethylene group). $R^{30}$ and $R^{31}$ are independently a $C_1$-$C_{10}$ alkyl group or a $C_1$-$C_{10}$ alkyl halide group.

Examples of the $C_1$-$C_{10}$ alkyl group include a methyl group, an ethyl group, a propyl group, an isopropyl group, an n-butyl group, an isobutyl group, a sec-butyl group, a t-butyl group, an n-pentyl group, an isopentyl group, a hexyl group, a cyclohexyl group, and the like. Examples of the $C_1$-$C_{10}$ alkyl halide group include a fluoromethyl group, a chloromethyl group, a bromomethyl group, a difluoromethyl group, a dichloromethyl group, a difluoromethyl group, a trifluoromethyl group, a trichloromethyl group, a 2,2,2-trifluoroethyl group, a pentafluoroethyl group, a heptafluoropropyl group, a perfluorobutyl group, a perfluoropentyl group, and the like.

It is preferable that $R^{28}$ be a $C_1$-$C_{20}$ branched alkyl group, a substituted or unsubstituted $C_6$-$C_{20}$ aryl group, or the group represented by the formula (3) (wherein $R^{29}$ is a $C_1$-$C_3$ alkylene group, and $R^{30}$ and $R^{31}$ are independently a $C_1$-$C_{10}$ alkyl group).

Specific examples of a preferable compound (2) include compounds in which $R^{28}$ is a $C_3$-$C_{20}$ branched alkyl group, such as N-(1-methylbutyl)-bicyclo[2.2.1]hept-5-ene-2,3-dicarboxyimide,
N-(2-methylbutyl)-bicyclo[2.2.1]hept-5-ene-2,3-dicarboxyimide,
N-(1-methylpentyl)-bicyclo[2.2.1]hept-5-ene-2,3-dicarboxyimide,
N-(2-methylpentyl)-bicyclo[2.2.1]hept-5-ene-2,3-dicarboxyimide,
N-(1-ethylbutyl)-bicyclo[2.2.1]hept-5-ene-2,3-dicarboxyimide,
N-(2-ethylbutyl)-bicyclo[2.2.1]hept-5-ene-2,3-dicarboxyimide,
N-(1-methylhexyl)-bicyclo[2.2.1]hept-5-ene-2,3-dicarboxyimide,
N-(2-methylhexyl)-bicyclo[2.2.1]hept-5-ene-2,3-dicarboxyimide,
N-(3-methylhexyl)-bicyclo[2.2.1]hept-5-ene-2,3-dicarboxyimide,
N-(1-butylpentyl)-bicyclo[2.2.1]hept-5-ene-2,3-dicarboxyimide,
N-(2-butylpentyl)-bicyclo[2.2.1]hept-5-ene-2,3-dicarboxyimide,
N-(1-methylheptyl)-bicyclo[2.2.1]hept-5-ene-2,3-dicarboxyimide,
N-(2-methylheptyl)-bicyclo[2.2.1]hept-5-ene-2,3-dicarboxyimide,
N-(3-methylheptyl)-bicyclo[2.2.1]hept-5-ene-2,3-dicarboxyimide,
N-(4-methylheptyl)-bicyclo[2.2.1]hept-5-ene-2,3-dicarboxyimide,
N-(1-ethylhexyl)-bicyclo[2.2.1]hept-5-ene-2,3-dicarboxyimide,
N-(2-ethylhexyl)-bicyclo[2.2.1]hept-5-ene-2,3-dicarboxyimide,
N-(3-ethylhexyl)-bicyclo[2.2.1]hept-5-ene-2,3-dicarboxyimide,
N-(1-propylpentyl)-bicyclo[2.2.1]hept-5-ene-2,3-dicarboxyimide,
N-(2-propylpentyl)-bicyclo[2.2.1]hept-5-ene-2,3-dicarboxyimide,
N-(1-methyloctyl)-bicyclo[2.2.1]hept-5-ene-2,3-dicarboxyimide,
N-(2-methyloctyl)-bicyclo[2.2.1]hept-5-ene-2,3-dicarboxyimide,
N-(3-methyloctyl)-bicyclo[2.2.1]hept-5-ene-2,3-dicarboxyimide,
N-(4-methyloctyl)-bicyclo[2.2.1]hept-5-ene-2,3-dicarboxyimide,
N-(1-ethylheptyl)-bicyclo[2.2.1]hept-5-ene-2,3-dicarboxyimide,
N-(2-ethylheptyl)-bicyclo[2.2.1]hept-5-ene-2,3-dicarboxyimide,
N-(3-ethylheptyl)-bicyclo[2.2.1]hept-5-ene-2,3-dicarboxyimide,
N-(4-ethylheptyl)-bicyclo[2.2.1]hept-5-ene-2,3-dicarboxyimide,
N-(1-propylhexyl)-bicyclo[2.2.1]hept-5-ene-2,3-dicarboxyimide,
N-(2-propylhexyl)-bicyclo[2.2.1]hept-5-ene-2,3-dicarboxyimide,
N-(3-propylhexyl)-bicyclo[2.2.1]hept-5-ene-2,3-dicarboxyimide,
N-(1-methylnonyl)-bicyclo[2.2.1]hept-5-ene-2,3-dicarboxyimide,
N-(2-methylnonyl)-bicyclo[2.2.1]hept-5-ene-2,3-dicarboxyimide,
N-(3-methylnonyl)-bicyclo[2.2.1]hept-5-ene-2,3-dicarboxyimide,
N-(4-methylnonyl)-bicyclo[2.2.1]hept-5-ene-2,3-dicarboxyimide,
N-(5-methynonyl)-bicyclo[2.2.1]hept-5-ene-2,3-dicarboxyimide,
N-(1-ethyloctyl)-bicyclo[2.2.1]hept-5-ene-2,3-dicarboxyimide,
N-(2-ethyloctyl)-bicyclo[2.2.1]hept-5-ene-2,3-dicarboxyimide,
N-(3-ethyloctyl)-bicyclo[2.2.1]hept-5-ene-2,3-dicarboxyimide,
N-(4-ethyloctyl)-bicyclo[2.2.1]hept-5-ene-2,3-dicarboxyimide,
N-(1-methydecyl)-bicyclo[2.2.1]hept-5-ene-2,3-dicarboxyimide,
N-(1-methyltridecyl)-bicyclo[2.2.1]hept-5-ene-2,3-dicarboxyimide,
N-(1-methyltetradecyl)-bicyclo[2.2.1]hept-5-ene-2,3-dicarboxyimide, and N-(1-methylpentadecyl)-bicyclo[2.2.1]hept-5-ene-2,3-dicarboxyimide;
compounds in which $R^{28}$ is a substituted or unsubstituted $C_6$-$C_{20}$ aryl group, such as
N-phenyl-bicyclo[2.2.1]hept-5-ene-2,3-dicarboxyimide,
N-(4-methylphenyl)-bicyclo[2.2.1]hept-5-ene-2,3-dicarboxyimide,
N-(3-chlorophenyl)-bicyclo[2.2.1]hept-5-ene-2,3-dicarboxyimide,
N-(1-naphthyl)-bicyclo[2.2.1]hept-5-ene-2,3-dicarboxyimide, and
N-(2-naphthyl)-bicyclo[2.2.1]hept-5-ene-2,3-dicarboxyimide; and
compounds in which $R^{28}$ is the group represented by the formula (3) (wherein $R^{29}$ is a $C_1$-$C_3$ alkylene group, and $R^{30}$ and $R^{31}$ are a $C_1$-$C_{10}$ alkyl group), such as methyl N-(endo-bicyclo[2.2.1]hept-5-ene-2,3-diyldicarbonyl)aspartate, ethyl N-(endo-bicyclo[2.2.1]hept-5-ene-2,3-diyldicarbonyl)aspartate, isopropyl N-(endo-bicyclo[2.2.1]hept-5-ene-2,3-diyldicarbonyl)aspartate, and ethyl N-(endo-bicyclo[2.2.1]hept-5-ene-2,3-diyldicarbonyl)methylglutaminate.

These cyclic olefins may be used either alone or in combination.

The compound (2) may be produced using an arbitrary method. For example, the compound (2) may be produced by subjecting the corresponding amine ($R^{28}$—$NH_2$) and 5-norbornene-2,3-dicarboxylic anhydride to an imidization reaction, or

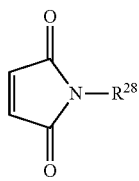

subjecting a maleimide represented by the above formula and cyclopentadiene to a Diels-Alder reaction.

When using the compound (2) as the cyclic olefin, it is preferable to use the compound (2) in combination with an additional cyclic olefin that is copolymerizable with the compound (2) (hereinafter may be referred to as "additional copolymerizable cyclic olefin").

Examples of the additional copolymerizable cyclic olefin include those mentioned above in connection with the cyclic olefin. It is preferable to use a cyclic olefin that includes a protonic polar group as the additional copolymerizable cyclic olefin.

The term "protonic polar group" used herein refers to a group in which a hydrogen atom is bonded directly to an atom that belongs to Group 15 or 16 in the periodic table. The atom that belongs to Group 15 or 16 in the periodic table is preferably an atom that belongs to the first or second period of Group 15 or 16 in the periodic table, more preferably an oxygen atom, a nitrogen atom, or a sulfur atom, and particularly preferably an oxygen atom. Specific examples of such a protonic polar group include polar groups that include an oxygen atom, such as a hydroxyl group, a carboxyl group (hydroxycarbonyl group), a sulfonic acid group, and a phosphoric acid group; polar groups that include a nitrogen atom, such as a primary amino group, a secondary amino group, a primary amide group, and a secondary amide group (imide group); polar groups that include a sulfur atom, such as a thiol group; and the like.

Among these, polar groups that include an oxygen atom are preferable, and polar groups that include a carboxyl group are more preferable.

Specific examples of the cyclic olefin that includes the protonic polar group include cyclic olefins that include a carboxyl group, such as
5-hydroxycarbonylbicyclo[2.2.1]hept-2-ene,
5-methyl-5-hydroxycarbonylbicyclo[2.2.1]hept-2-ene,
5-carboxymethyl-5-hydroxycarbonylbicyclo[2.2.1]hept-2-ene,
5,6-dihydroxycarbonylbicyclo[2.2.1]hept-2-ene,
4-hydroxycarbonyltetracyclo[6.2.1.1$^{3,6}$.0$^{2,7}$]dodec-9-ene,
4-methyl-4-hydroxycarbonyltetracyclo[6.2.1.1$^{3,6}$.0$^{2,7}$]dodec-9-ene, and
4,5-dihydroxycarbonyltetracyclo[6.2.1.1$^{3,6}$.0$^{2,7}$]dodec-9-ene;
cyclic olefins that include a hydroxyl group, such as
5-(4-hydroxyphenyl)bicyclo[2.2.1]hept-2-ene,
5-methyl-5-(4-hydroxyphenyl)bicyclo[2.2.1]hept-2-ene,
9-(4-hydroxyphenyl)tetracyclo[6.2.1.1$^{3,6}$.0$^{2,7}$]dodec-4-ene, and
9-methyl-9-(4-hydroxyphenyl)tetracyclo[6.2.1.1$^{3,6}$.0$^{2,7}$]dodec-4-ene; and the like.

These cyclic olefins may be used either alone or in combination.

When using the compound (2) and the additional copolymerizable cyclic olefin as the cyclic olefin, the additional copolymerizble cyclic olefin is preferably used in a ratio of 10 to 90 mol % based on the total cyclic olefins. If the ratio of the additional copolymerizable cyclic olefin is too small, the radiation sensitivity of the radiation-sensitive compound (described later) may decrease, or a residue may occur during development. If the ratio of the additional copolymerizable cyclic olefin is too large, solubility in a solvent during a reaction may be insufficient.

A more preferable ratio of the additional copolymerizable cyclic olefin differs depending on the application. For example, when forming a resin film that is patterned by photolithography (described later), the additional copolymerizable cyclic olefin is preferably used in a ratio of 40 to 80 mol %, and particularly preferably 50 to 70 mol %, based on the total cyclic olefins. When forming a resin film that is not patterned by photolithography, the additional copolymerizable cyclic olefin is preferably used in a ratio of 10 to 80 mol %, and particularly preferably 30 to 70 mol %, based on the total cyclic olefins.

(2) Ruthenium Compound

In the production method according to one embodiment of the invention, at least one ruthenium compound selected from the group consisting of the ruthenium compound represented by the following formula (I), the ruthenium compound represented by the following formula (II), the ruthenium compound represented by the following formula (III), and the ruthenium compound represented by the following formula (IV) is used as the polymerization catalyst.

Note that the ruthenium compound represented by the formula (I) may be referred to as "ruthenium compound (I)", the ruthenium compound represented by the formula (II) may be referred to as "ruthenium compound (II)", the ruthenium compound represented by the formula (III) may be referred to as "ruthenium compound (III)", and the ruthenium compound represented by the formula (IV) may be referred to as "ruthenium compound (IV)".

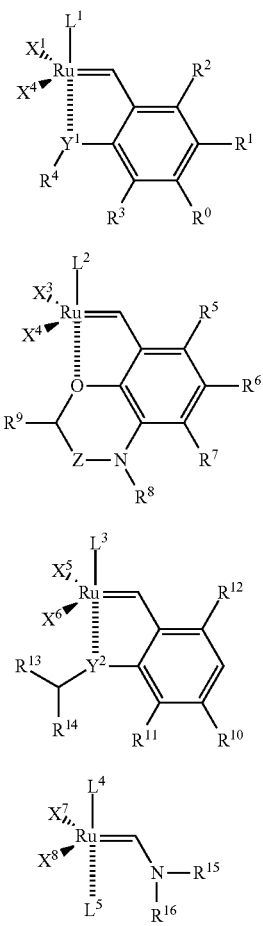

(I)

(II)

(III)

(IV)

In the formulas (I) to (IV), $X^1$ to $X^8$ are independently a halogen atom (e.g., fluorine atom, chlorine atom, or bromine atom), or a group represented by $R^a(=O)O—$.

$R^a$ is a substituted or unsubstituted $C_1$-$C_{20}$ alkyl group.

Examples of the $C_1$-$C_{20}$ alkyl group represented by $R^a$ include a methyl group, an ethyl group, a propyl group, an isopropyl group, an n-butyl group, an isobutyl group, a sec-butyl group, a t-butyl group, an n-pentyl group, an isopentyl group, a hexyl group, a heptyl group, an octyl group, a nonyl group, a decyl group, an eicosyl group, a heneicosyl group, a docosyl group, and the like.

It is preferable that $X^1$ to $X^8$ be a halogen atom, and particularly preferably a chlorine atom, since the object of the invention can be more easily achieved.

$L^1$ to $L^5$ are independently an electron-donating ligand.

It is preferable that $L^1$ to $L^4$ be a ligand represented by the following formula (1-1), a ligand represented by the following formula (1-2), or a ligand represented by the following formula (1-3).

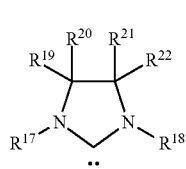

(1-1)

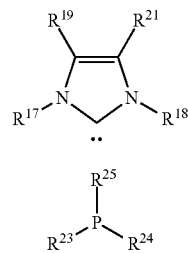

(1-2)

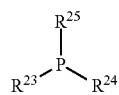

(1-3)

In the formulas (1-1) to (1-3), $R^{17}$ and $R^{18}$ are independently a hydrogen atom, or a $C_1$-$C_{20}$ hydrocarbon group that optionally includes a halogen atom, an oxygen atom, a nitrogen atom, a sulfur atom, a phosphorus atom, and/or a silicon atom.

$R^{19}$ to $R^{22}$ are independently a hydrogen atom or a $C_1$-$C_{10}$ alkyl group.

$R^{23}$ to $R^{25}$ are independently a $C_1$-$C_{20}$ alkyl group, a $C_3$-$C_{20}$ cycloalkyl group, a $C_1$-$C_{20}$ alkoxy group, a substituted or unsubstituted $C_6$-$C_{20}$ aryl group, a substituted or unsubstituted $C_6$-$C_{20}$ aryloxy group, or a substituted or unsubstituted $C_2$-$C_{20}$ heterocyclic group.

Examples of the $C_1$-$C_{20}$ hydrocarbon group represented by $R^{17}$ and $R^{18}$ that optionally includes a halogen atom or the like include $C_1$-$C_{20}$ alkyl groups such as a methyl group, an ethyl group, an isopropyl group, and a t-butyl group; $C_3$-$C_{20}$ cycloalkyl groups such as a cyclopropyl group, a cyclobutyl group, a cyclopentyl group, a cyclohexyl group, a cycloheptyl group, and an adamantyl group; $C_2$-$C_{20}$ alkenyl groups such as a vinyl group, a 1-propenyl group, an allyl group, a 1-butenyl group, a 2-butenyl group, and a hexenyl group; $C_3$-$C_{20}$ cycloalkenyl groups such as a cyclopentenyl group and a cyclohexenyl group; $C_2$-$C_{20}$ alkynyl groups such as an ethynyl group, a 1-propynyl group, and a 2-propynyl (propargyl) group; substituted or unsubstituted $C_6$-$C_{20}$ aryl groups such as a phenyl group, a 4-methylphenyl group, a 2,4-dimethylphenyl group, a 2,4,6-trimethylphenyl group, a biphenyl group, a 1-naphthyl group, a 2-naphthyl group, and a methylnaphthyl group; $C_7$-$C_{20}$ alkynyl groups such as a benzyl group and a phenethyl group; and the like.

Examples of the $C_1$-$C_{10}$ alkyl group represented by $R^{19}$ to $R^{22}$ include a methyl group, an ethyl group, a propyl group, an isopropyl group, an n-butyl group, an isobutyl group, a sec-butyl group, a t-butyl group, an n-pentyl group, an isopentyl group, a hexyl group, a nonyl group, and the like.

Examples of the $C_1$-$C_{20}$ alkyl group represented by $R^{23}$ and $R^{24}$ include a methyl group, an ethyl group, a propyl group, an isopropyl group, an n-butyl group, an isobutyl group, a sec-butyl group, a t-butyl group, an n-pentyl group, an isopentyl group, a hexyl group, a heptyl group, an octyl group, a nonyl group, a decyl group, an eicosyl group, a heneicosyl group, a docosyl group, and the like.

Examples of the $C_3$-$C_{20}$ cycloalkyl group include a cyclopropyl group, a cyclobutyl group, a cyclopentyl group, a cyclohexyl group, a cycloheptyl group, and the like.

Examples of the $C_1$-$C_{20}$ alkoxy group include a methoxy group, an ethoxy group, a propoxy group, an isopropoxy group, a butoxy group, an isobutoxy group, a sec-butoxy group, a t-butoxy group, and the like.

Examples of the $C_6$-$C_{20}$ aryl group include a phenyl group, a 4-methylphenyl group, a 2,4-dimethylphenyl group, a 2,4,6-trimethylphenyl group, and the like.

Examples of the $C_6$-$C_{20}$ aryloxy group include a phenoxy group, a 1-naphthoxy group, a 2-naphthoxy group, and the like.

Examples of the $C_2$-$C_{20}$ heterocyclic group include a furyl group, a thienyl group, a pyridyl group, a piperazinyl group, an oxanyl group, and the like.

It is preferable that $L^1$ to $L^4$ be the ligand (carbene compound) represented by the formula (1-1) or the ligand (carbene compound) represented by the formula (1-2), and more preferably the ligand (carbene compound) represented by the formula (1-1), since the object of the invention can be easily achieved.

Specific examples of the ligand represented by the formula (1-1) include 1,3-diisopropylimidazolidin-2-ylidene, 1,3-dicyclohexyl imidazolidin-2-ylidene, 1,3-di(methylphenyl)imidazolidin-2-ylidene, 1,3-di(methylnaphthyl)imidazolidin-2-ylidene, 1,3-dimesitylimidazolidin-2-ylidene, 1,3-diadamantylimidazolidin-2-ylidene, 1,3-diphenylimidazolidin-2-ylidene, 1,3-di(2,6-diisopropylphenyl)imidazolidin-2-ylidene, and the like.

Specific examples of the ligand represented by the formula (1-2) include 1,3-diisopropyl-4-imidazolin-2-ylidene, 1,3-dicyclohexyl-4-imidazolin-2-ylidene, 1,3-di(methylphenyl)-4-imidazolin-2-ylidene, 1,3-di(methylnaphthyl)-4-imidazolin-2-ylidene, 1,3-dimesityl-4-imidazolin-2-ylidene, 1,3-diadamantyl-4-imidazolin-2-ylidene, 1,3-diphenyl-4-imidazolin-2-ylidene, 1,3-dimesityl-4,5-dimethyl-4-imidazolin-2-ylidene, and the like.

$L^1$ to $L^4$ may be a heteroatom-containing carbene compound such as 1,3,4,5-tetramethylimidazolin-2-ylidene, 1,3,4,5-tetramethyl-4-imidazolin-2-ylidene, 1,3,4,5-tetraphenyl-4-imidazolin-2-ylidene, 1,3,4-triphenyl-2,3,4,5-tetrahydro-1H-1,2,4-triazol-5-ylidene, 3-(2,6-diisopropylphenyl)-2,3,4,5-tetrahydrothiazol-2-ylidene, 1,3-dicyclohexylhexahydropyrimidin-2-ylidene, N,N,N',N'-tetraisopropylformamidynilidene, 1,3,4-triphenyl-4,5-dihydro-1H-1,2,4-triazol-5-ylidene, or 3-(2,6-diisopropylphenyl)-2,3-dihydrothiazol-2-ylidene.

It is preferable that $L^5$ be a carbonyl, an amine, a pyridine, an ether, a nitrite, an ester, a phosphine, a thioether, an aromatic compound, an olefin, an isocyanide, a thiocyanate, or the like, more preferably a phosphine or a pyridine, and particularly preferably a phosphine.

Examples of the phosphine include a trialkylphosphine, tricyclohexylphosphine, tricyclopentylphosphine, and the like.

$R^0$ is a hydrogen atom, a halogen atom, a nitro group, a cyano group, a $C_1$-$C_{20}$ alkyl group, a $C_1$-$C_{20}$ alkoxy group, a $C_1$-$C_{20}$ alkylthio group, a tri-$C_1$-$C_{20}$ alkylsilyl group, a tri-$C_1$-$C_{20}$ alkylsilyloxy group, a substituted or unsubstituted $C_6$-$C_{20}$ aryl group, a substituted or unsubstituted $C_6$-$C_{20}$ aryloxy group, a substituted or unsubstituted $C_2$-$C_{20}$ heterocyclic group, a $C_1$-$C_{20}$ alkylsulfonyl group, a $C_1$-$C_{20}$ alkylsulfinyl group, a formyl group, a $C_1$-$C_{20}$ alkylcarbonyl group, a $C_1$-$C_{20}$ alkoxycarbonyl group, a di-$C_1$-$C_{20}$ alkylcarbamoyl group, a di-$C_1$-$C_{20}$ alkylureido group, or a $C_1$-$C_{20}$ alkylsulfonylamino group.

Examples of the halogen atom represented by $R^0$ include a fluorine atom, a chlorine atom, a bromine atom, and the like.

Examples of the $C_1$-$C_{20}$ alkyl group include a methyl, group, an ethyl, group, a propyl group, an isopropyl group, a butyl group, an isobutyl group, a sec-butyl group, a t-butyl group, a pentyl group, a hexyl group, a heptyl group, an octyl group, a nonyl group, a decyl group, an undecyl group, and the like.

Examples of the $C_1$-$C_{20}$ alkoxy group include a methoxy group, an ethoxy group, a propoxy group, an isopropoxy group, a butoxy group, a sec-butoxy group, a t-butoxy group, a pentyloxy group, a hexyloxy group, a heptyloxy group, an octyloxy group, a nonyloxy group, a decyloxy group, and the like.

Examples of the $C_1$-$C_{20}$ alkylthio group include a methylthio group, an ethylthio group, a t-butylthio group, and the like.

Examples of the tri-$C_1$-$C_{20}$ alkylsilyl group include a trimethylsilyl group, a triethylsilyl group, a t-butyldimethylsilyl group, a tributylsilyl group, and the like.

Examples of the tri-$C_1$-$C_{20}$ alkylsilyloxy group include a trimethylsilyloxy group, a triethylsilyloxy group, a t-butyl dimethylsilyloxy group, a tributylsilyloxy group, and the like.

Examples of the $C_6$-$C_{20}$ aryl group include a phenyl group, a 1-naphthyl group, a 2-naphthyl group, and the like.

Examples of the $C_6$-$C_{20}$ aryloxy group include a phenoxy group, a 1-naphthyloxy group, a 2-naphthyloxy group, and the like.

Examples of the $C_2$-$C_{20}$ heterocyclic group include oxygen-containing heterocyclic groups such as a furanyl group, a pyranyl group, and a dioxoranyl group; sulfur-containing heterocyclic groups such as a thienyl group; saturated or unsaturated nitrogen-containing heterocyclic groups such as a pyrrolyl group, an imidazolyl group, a pyrazolyl group, an oxazolyl group, an isoxazolyl group, a triazolyl group, a thiazolyl group, an isothiazolyl group, a pyridyl group, a pyradazinyl group, a pyrazinyl group, a benzimidazolyl group, a benzopyrazolyl group, a benzothiazolyl group, a quinolyl group, an indolyl group, and a phenanthrynylyl group; and the like.

Examples of a substituent that may substitute the $C_6$-$C_{20}$ aryl group, the $C_6$-$C_{20}$ aryloxy group, and the $C_2$-$C_{20}$ heterocyclic group include halogen atoms such as a fluorine atom, a chlorine atom, and a bromine atom; $C_1$-$C_6$ alkyl groups such as a methyl group and an ethyl group; $C_1$-$C_6$ alkoxy groups such as a methoxy group, an ethoxy group, and a t-butoxy group; a nitro group; a cyano group; and the like.

Examples of the $C_1$-$C_{20}$ alkylsulfonyl group include a methylsulfonyl group, an ethylsulfonyl group, and the like.

Examples of the $C_1$-$C_{20}$ alkylsulfinyl group include a tnethylsulfinyl group, an ethylsulfinyl group, and the like.

Examples of the $C_1$-$C_{20}$ alkylcarbonyl group include an acetyl group, a propionyl group, a propylcarbonyl group, and the like.

Examples of the $C_1$-$C_{20}$ alkoxycarbonyl group include a methoxycarbonyl group, an ethoxycarbonyl group, and the like.

Examples of the di-$C_1$-$C_{20}$ alkylcarbamoyl group include a dimethylcarbamoyl group, a methylethylcarbamoyl group, a diethylcarbamoyl group, and the like.

Examples of the di-$C_1$-$C_{20}$ alkylureido group include a dimethyl ureido group, a diethylureido group, and the like.

Examples of the $C_1$-$C_{20}$ alkylsulfonylamino group include a methylsulfonylamino group, an ethylsulfonylamino group, and the like.

$R^1$ is a group represented by $(R^{b1})(R^{b2})NSO_2-$, a formyl group, a $C_1$-$C_{20}$ alkylcarbonyl group, a $C_1$-$C_{20}$ alkoxycarbonyl group, a group represented by $(R^{c1})(R^{c2})NCO-$, an amide group, a halogen atom, a di-$C_1$-$C_{20}$ alkylureido group, or a $C_1$-$C_{20}$ alkylsulfonyl amino group.

$R^{b1}$ and $R^{c1}$ are a hydrogen atom, a $C_1$-$C_{20}$ alkyl group, or a substituted or unsubstituted aryl group, $R^{b2}$ and $R^{c2}$ are a hydrogen atom, a $C_1$-$C_{20}$ alkyl group, a substituted or unsubstituted aryl group, or a group represented by G-D- (wherein D is a linking group, and G is a polymer main chain), provided that $R^{b1}$ and $R^{b2}$ or $R^{c1}$ and $R^{c2}$ optionally bond to each other to form a ring.

Examples of the $C_1$-$C_{20}$ alkylcarbonyl group, the $C_1$-$C_{20}$ alkoxycarbonyl group, the halogen atom, the di-$C_1$-$C_{20}$ alkylureido group, or the $C_1$-$C_{20}$ alkylsulfonylamino group represented by $R^1$ include those mentioned above in connection with $R^0$.

Examples of the $C_1$-$C_{20}$ alkyl group or the substituted or unsubstituted aryl group represented by $R^{b1}$, $R^{b2}$, $R^{c1}$, and $R^{c2}$ include those mentioned above in connection with $R^6$.

Examples of the linking group represented by D included in the group represented by G-D- include a single bond; $C_1$-$C_6$ alkylene groups such as a methylene group, an ethylene group, a propylene group, and a trimethylene group; $C_1$-$C_{20}$ arylene groups such as a p-phenylene group and an m-phenylene group; —C(=O)—; —O—; —S—; —NH—; —N(CH$_3$)—; —C(=O)—O—; —O—C(=O)—; —NH—C(=O)—; —C(=O)—NH—; combinations thereof; and the like.

The polymer main chain represented by G is not particularly limited as to the repeating unit, the molecular weight, and the like as long as the polymer main chain can support the ruthenium complex through the partial structure represented by -D-, Examples of the polymer main chain represented by G include polymers that include a surface or terminal functional group (e.g., OH group, SH group, NH$_2$ group, CO$_2$H group, CH$_2$OH group, CH$_2$CH$_2$OH group, CH$_2$SH group, or CH$_2$NH$_2$ group).

Examples of such polymers that include a functional group include organic polymers such as a polyalkylene glycol and a styrene-based resin; inorganic polymers such as silica gel and diatomaceous earth; and the like. Among these, organic polymers are preferable from the viewpoint of availability and the like.

Examples of the polyalkylene glycol include polyethylene glycol, polypropylene glycol, and the like.

The styrene-based resin refers to a resin that includes a polymer that includes an aromatic vinyl monomer. Examples of the aromatic vinyl monomer include styrene, α-methylstyrene, p-methylstyrene, p-chloromethylstyrene, vinyltoluene, p-t-butylstyrene, o-ethylstyrene, o-chlorostyrene, o,p-dichlorostyrene, and the like.

The partial structure represented by -D-G may be formed using a method known in synthetic organic chemistry. For example, a partial structure (-D'-C(=O)—O-G) that includes an ester linkage can be formed by reacting a polymer that includes a surface or terminal hydroxyl group (OH group) with a compound (-D'-CO$_2$H) that includes a terminal carboxyl group in the presence of a dehydrating agent. In this case, D'-C(=O)—O— corresponds to -D-.

$R^{b1}$ and $R^{b2}$ or $R^{c1}$ and $R^{c2}$ optionally bond to each other to form a ring that includes a nitrogen atom. In this case, $R^{b1}$ may be bonded to an arbitrary carbon atom of $R^{b2}$, and $R^{c1}$ may be bonded to an arbitrary carbon atom of $R^{c2}$.

An example of R when $R^{b1}$ and $R^{b2}$ bond to each other to form a ring that includes a nitrogen atom is shown below.

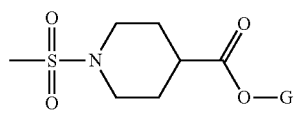

wherein G is the same as defined above.

It is preferable that $R^0$ be the group represented by $(R^{b1})(R^{b2})NSO_2$—, and more preferably the group represented by $(R^{b1})(R^{b2})NSO_2$— wherein $R^{b1}$ and $R^{b2}$ are independently a $C_1$-$C_6$ alkyl group.

$R^2$, $R^3$, $R^5$, $R^6$, $R^7$, $R^{10}$, $R^{11}$, and $R^{12}$ are independently a hydrogen, atom, a halogen atom, a $C_1$-$C_{20}$ alkyl group, a $C_1$-$C_{20}$ alkoxy group, a $C_1$-$C_{20}$ alkylthio group, a tri-$C_1$-$C_{20}$ alkylsilyloxy group, a $C_6$-$C_{20}$ aryloxy group, a $C_6$-$C_{20}$ aryl group, a $C_2$-$C_{20}$ heterocyclic group, a $C_1$-$C_{20}$ alkoxycarbonyl group, a di-$C_1$-$C_{20}$ alkylcarbamoyl group, a di-$C_1$-$C_{20}$ alkylureido group, or a $C_1$-$C_{20}$ alkylsulfonylamino group.

Examples of the halogen atom, the $C_1$-$C_{20}$ alkyl group, the $C_1$-$C_{20}$ alkoxy group, the $C_1$-$C_{20}$ alkylthio group, the tri-$C_1$-$C_{20}$ alkylsilyloxy group, the $C_6$-$C_{20}$ aryloxy group, the $C_6$-$C_{20}$ aryl group, the $C_2$-$C_{20}$ heterocyclic group, the $C_1$-$C_{20}$ alkoxycarbonyl group, the di-$C_1$-$C_{20}$ alkylcarbamoyl group, the di-$C_1$-$C_{20}$ alkylureido group, and the $C_1$-$C_{20}$ alkylsulfonylamino group represented by $R^2$, $R^3$, $R^5$, $R^6$, $R^7$, $R^{10}$, $R^{11}$, and $R^{12}$ include those mentioned above in connection with $R^0$.

$R^4$, $R^8$, $R^9$, $R^{13}$, $R^{14}$, $R^{15}$, and $R^{16}$ are independently a hydrogen atom, a $C_1$-$C_{20}$ alkyl group, a $C_1$-$C_{20}$ alkoxy group, a $C_1$-$C_{20}$ alkylthio group, a tri-$C_1$-$C_{20}$ alkylsilyl group, a tri-$C_1$-$C_{20}$ alkylsilyloxy group, a substituted or unsubstituted $C_6$-$C_{20}$ aryl group, a substituted or unsubstituted $C_6$-$C_{20}$ aryloxy group, a substituted or unsubstituted $C_2$-$C_{20}$ heterocyclic group, a $C_1$-$C_{20}$ alkylsulfonyl group, a $C_1$-$C_{20}$ alkylsulfinyl group, a $C_1$-$C_{20}$ alkylcarbonyl group, a $C_1$-$C_{20}$ alkoxycarbonyl group, a di-$C_1$-$C_{20}$ alkylcarbamoyl group, a di-$C_1$-$C_{20}$ alkylureido group, a $C_1$-$C_{20}$ alkylsulfonylamino group, or a $C_6$-$C_{20}$ arylcarbonyl group that is optionally substituted with a halogen atom.

Examples of the $C_1$-$C_{20}$ alkyl group, the $C_1$-$C_{20}$ alkoxy group, the $C_1$-$C_{20}$ alkylthio group, the tri-$C_1$-$C_{20}$ alkylsilyl group, the tri-$C_1$-$C_{20}$ alkylsilyloxy group, the substituted or unsubstituted $C_6$-$C_{20}$ aryl group, the substituted or unsubstituted $C_6$-$C_{20}$ aryloxy group, the substituted or unsubstituted $C_2$-$C_{20}$ heterocyclic group, the $C_1$-$C_{20}$ alkylsulfonyl group, the $C_1$-$C_{20}$ alkylsulfinyl group, the $C_1$-$C_{20}$ alkylcarbonyl group, the $C_1$-$C_{20}$ alkoxycarbonyl group, the di-$C_1$-$C_{20}$ alkylcarbamoyl group, the di-$C_1$-$C_{20}$ alkylureido group, and the $C_1$-$C_{20}$ alkylsulfonylamino group represented by $R^4$, $R^8$, $R^9$, $R^{13}$, $R^{14}$, $R^{15}$, and $R^{16}$ include those mentioned above in connection with $R^0$.

Examples of the $C_6$-$C_{20}$ arylcarbonyl group represented by $R^4$, $R^8$, $R^9$, $R^{13}$, $R^{14}$, $R^{15}$, and $R^{16}$ that is optionally substituted with a halogen atom include a benzoyl group, a 4-chlorobenzoyl group, a 2-fluorobenzoyl group, a 2,6-dibromobenzoyl group, a 1-naphthylcarbonyl group, a 2-naphthylcarbonyl group, and the like.

$Y^1$ and $Y^2$ are independently an oxygen atom, a sulfur atom, $NR^b$, or $PR^b$, and $R^b$ is a hydrogen atom or a $C_1$-$C_{20}$ alkyl group (e.g., methyl group, ethyl group, propyl group, isopropyl group, butyl group, or t-butyl group).

Z is a group represented by —C($R^b$)($R^c$)— or a carbonyl group. $R^b$ and $R^c$ are independently a hydrogen atom, a $C_1$-$C_6$ alkyl group (e.g., methyl group, ethyl group, n-propyl group, isopropyl group, n-butyl group, isobutyl group, n-pentyl group, or n-hexyl group, or a halo-$C_1$-$C_6$ alkyl group (e.g., chloromethyl group, dichloromethyl group, fluoromethyl group, trifluoromethyl group, or bromomethyl group).

The ruthenium compound (I) is preferably a compound represented by the following formula (I-1), more preferably a compound represented by the following formula (I-2), and particularly preferably a compound represented by the following formula (I-3) or a compound represented by the following formula (I-4), since the object of the invention can be more easily achieved.

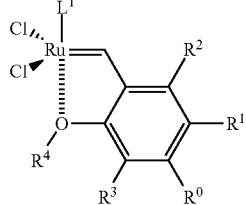
(I-1)

wherein $R^0$ to $R^4$ and $L^1$ are the same as defined above.

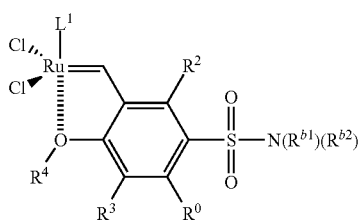
(I-2)

wherein $R^0$, $R^2$ to $R^4$, and $L^1$ are the same as defined above.

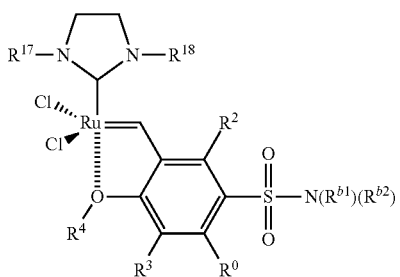
(I-3)

wherein $R^0$, $R^2$ to $R^4$, $R^{17}$, $R^{18}$, $R^{b1}$, and $R^{b2}$ are the same as defined above.

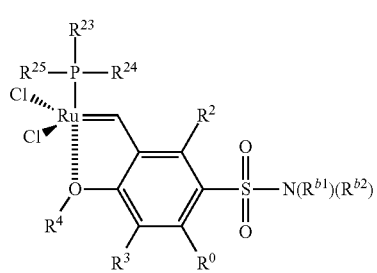
(I-4)

wherein $R^0$, $R^2$ to $R^4$, $R^{23}$ to $R^{25}$, $R^{b1}$, and $R^{b2}$ are the same as defined above.

The ruthenium compound (II) is preferably a compound represented by the following formula (II-1), and more preferably a compound represented by the following formula (II-2).

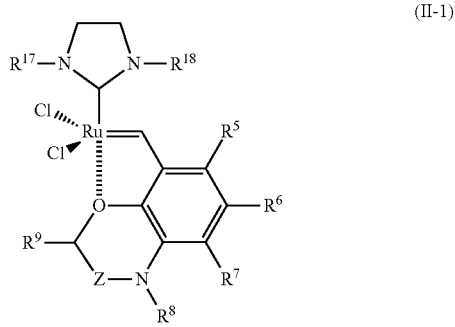
(II-1)

wherein $R^5$ to $R^9$, $R^{17}$, $R^{18}$, and Z are the same as defined above.

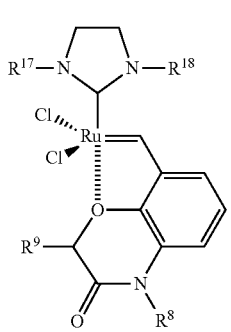
(II-2)

wherein $R^8$, $R^9$, $R^{17}$, and $R^{18}$ are the same as defined above.

The ruthenium compound (III) is preferably a compound represented by the following formula (III-1), and more preferably a compound represented by the following formula (III-2).

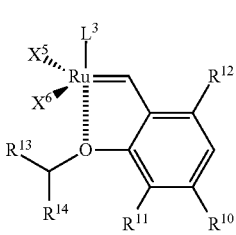
(III-1)

wherein $R^{10}$ to $R^{14}$, $R^{17}$, and $R^{18}$ are the same as defined above.

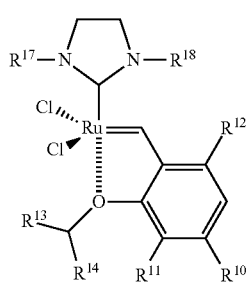
(III-2)

wherein $R^{10}$ to $R^{14}$, $R^{17}$, and $R^{18}$ are the same as defined above.

The ruthenium compound (IV) is preferably a compound represented by the following formula (IV-1).

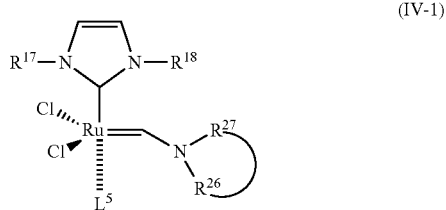

(IV-1)

wherein $R^{17}$, $R^{18}$, and $L^5$ are the same as defined above, and

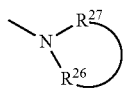

the group represented by the above formula is a nitrogen-containing heterocyclic group that is bonded through the nitrogen atom (hereinafter may be referred to as "nitrogen-containing heterocyclic group A").

Specific examples of the nitrogen-containing heterocyclic group A include the following five to eight-membered nitrogen-containing heterocyclic groups.

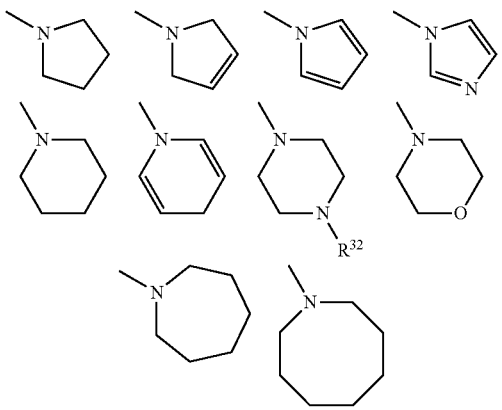

wherein $R^{32}$ is a hydrogen atom, a $C_1$-$C_6$ alkyl group (e.g., methyl group or ethyl group), or an aryl group (e.g., phenyl group).

These groups may be substituted with a substituent at an arbitrary position. Examples of the substituent include halogen atoms such as a fluorine atom and a chlorine atom; $C_1$-$C_6$ alkyl groups such as a methyl group and an ethyl group; $C_1$-$C_6$ alkoxy groups such as a methoxy group and an ethoxy group; substituted or unsubstituted aryl groups such as a phenyl group and a 4-chlorophenyl group; an oxo group (=O); a nitro group; a cyano group; and the like. A plurality of substituents may bond to each other to form a fused ring.

Among these, the group represented by the following formula (4a) and the group represented by the following formula (4b) are particularly preferable.

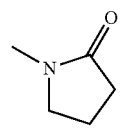

(4a)

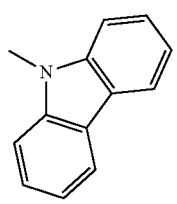

(4b)

Method for Producing Ruthenium Compound

The ruthenium compounds (I) to (IV) used in connection with the production method according to one embodiment of the invention may be produced as described below.

(1) Production Method 1

The ruthenium compound (I) can be produced using the method described in JP-T-2008-546846.

For example, a vinyl benzene derivative represented by the following formula (4) and a ruthenium compound represented by the following formula (V-1) are reacted in a solvent (e.g., dichloromethane or toluene) in the presence of copper(I) chloride to obtain the target ruthenium compound (I) (see the following reaction formula).

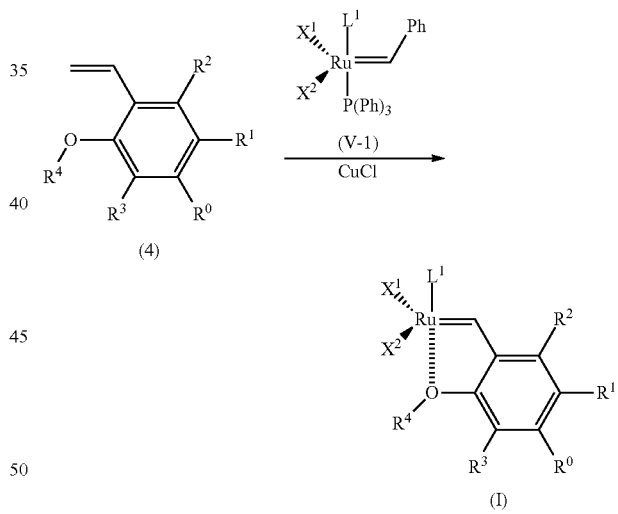

wherein $L^1$, $X^1$, $X^2$, and $R^0$ to $R^4$ are the same as defined above.

A commercially available product may be used directly as the ruthenium compound (I).

(2) Production Method 2

The ruthenium compound (II) can be produced using the method described in WO2012/013208.

For example, a vinyl benzene derivative represented by the following formula (5) and a ruthenium compound represented by the following formula (V-2) are reacted in a solvent (e.g., dichloromethane or toluene) in the presence of copper(I) chloride to obtain the target ruthenium compound (II) (see the following reaction formula).

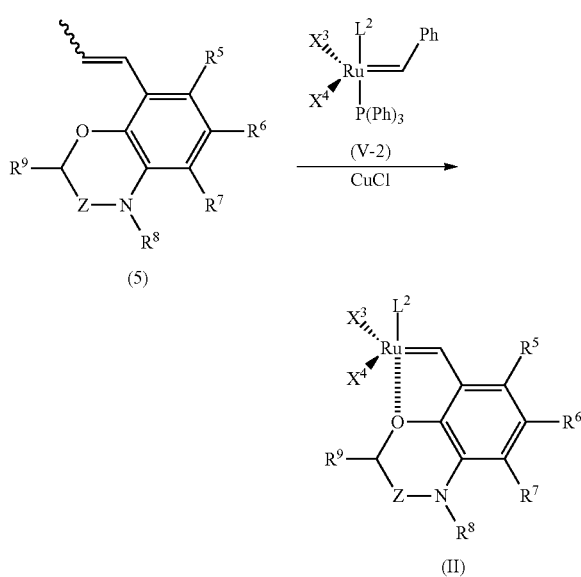

wherein $L^2$, $X^3$, $X^4$, $R^5$ to $R^9$, and Z are the same as defined above.

A commercially available product may be used directly as the ruthenium compound (II).

Note that the compound represented by the formula (5) may be synthesized as described below, for example.

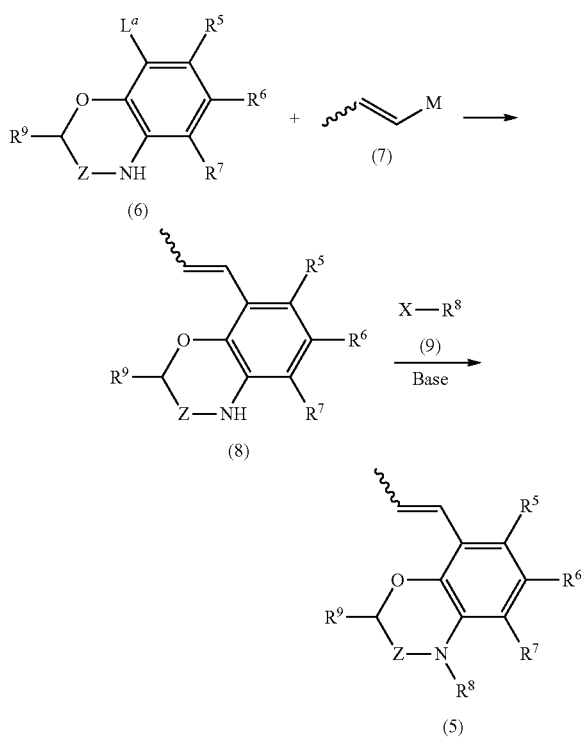

wherein $R^5$ to $R^9$ and Z are the same as defined above. $L^a$ is Br, I, $OSO_2CF_3$, or $OSO_2F$, M is $Sn(R^d)_3$, $B(OH)_2$, or $ZnX^a$, and X is a halogen atom (e.g., fluorine atom or bromine atom), $R^d$ is $C_1$-$C_4$ alkyl group (e.g., methyl group, ethyl group, n-propyl group, isopropyl group, n-butyl group, or t-butyl group), and $X^a$ is a halogen atom (e.g., fluorine atom or bromine atom).

Specifically, the compound represented by the formula (6) and the compound represented by the formula (7) are reacted optionally in the presence of a catalyst such as tetrakis(triphenylphosphine)palladium to obtain the compound represented by the formula (8), and the compound represented by the formula (8) and the compound represented by the formula (9) are reacted in the presence of a base such as NaH to obtain the compound represented by the formula (5) (see WO2012/13208 and JP-T-2001-508458, for example).

(3) Production Method 3

The ruthenium compound (III) can be produced using the method described in JP-T-2004-506755, JP-T-2007-501199, JP-A-2008-273971, JP-T-2010-503713, or JP-T-2011-522778, for example.

For example, a vinyl benzene derivative represented by the following formula (10) and a ruthenium compound represented by the following formula (V-3) are reacted in a solvent (e.g., dichloromethane or toluene) in the presence of copper(I) chloride to obtain the target ruthenium compound (III) (see the following reaction formula).

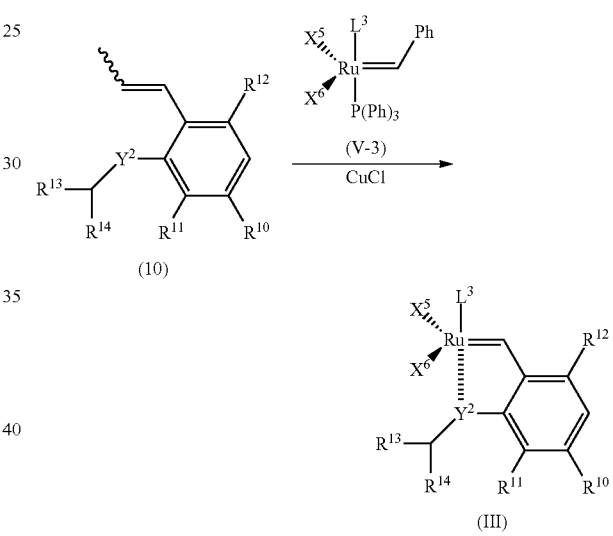

wherein $L^3$, $X^5$, $X^6$, and $R^{10}$ to $R^{14}$ are the same as defined above.

A commercially available product may be used directly as the ruthenium compound (III).

Many of the compounds represented by the formula (10) are known compounds, and may be produced using a known method (see JP-T-2004-506755, JP-T-2010-503713, and JP-T-2007-501199, for example). A commercially available product of the compound represented by the formula (10) may be used directly, or may be used after purification.

(4) Production Method 4

The ruthenium compound (IV) can be produced using the method described in Organometallics, Vol. 21, p. 2153, 2002.

For example, a vinylamine derivative represented by the following formula (11) and a ruthenium compound represented by the following formula (V-4) are reacted in a solvent (e.g., dichloromethane or toluene) to obtain the target ruthenium compound (IV) (see the following reaction formula).

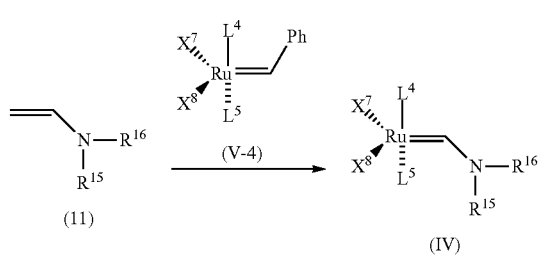

wherein $L^4$, $L^5$, $X^7$, $X^8$, $R^{15}$, and $R^{16}$ are the same as defined above.

A commercially available product may be used directly as the ruthenium compound (IV).

Many of the compounds represented by the formula (IV) are known compounds, and may be produced using a known method.

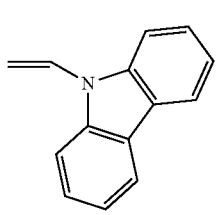

(4b)

For example, the compound represented by the formula (4b) can be obtained by (i) reacting carbazole and acetylene optionally in the presence of a base catalyst such as sodium hydroxide (see JP-A-48-68564), or (ii) producing N-(2-hydroxyethyl)carbazole) from carbazole, and subjecting N-(2-hydroxyethyl)carbazole) to intramolecular dehydration (see WO2006/046540).

A commercially available product of the compound represented by the formula (IV) may be used directly, or may be used after purification.

(3) Ring-Opening Metathesis Polymerization Reaction

In the production method according to one embodiment of the invention, the cyclic olefin is subjected to the ring-opening metathesis polymerization reaction using at least one ruthenium compound selected from the group consisting of the ruthenium compound (I), the ruthenium compound (II), the ruthenium compound (III), and the ruthenium compound (IV) (hereinafter may be collectively referred to as "ruthenium compound") as the polymerization catalyst.

The polymerization catalyst is normally used so that the molar ratio of metallic ruthenium in the polymerization catalyst to the cyclic olefin (metallic ruthenium in polymerization catalyst:cyclic olefin) is 1:100 to 1:2,000,000, preferably 1:500 to 1,000,000, and more preferably 1:1000 to 1:500,000. If the amount of the catalyst is too large, it may be difficult to remove the catalyst. If the amount of the catalyst is too small, sufficient polymerization activity may not be obtained.

A solvent is not particularly limited as long as the solvent can dissolve the resulting polymer under specific conditions, and does not affect the polymerization reaction.

Examples of the solvent include linear aliphatic hydrocarbon-based solvents such as pentane, hexane, and heptane; alicyclic hydrocarbon-based solvents such as cyclopentane, cyclohexane, methylcyclohexane, dimethylcyclohexane, trimethylcyclohexane, ethylcyclohexane, diethylcyclohexane, decahydronaphthalene, bicycloheptane, tricyclodecane, hexahydroindenecyclohexane, and cyclooctane; aromatic hydrocarbon-based solvents such as benzene, toluene, and xylene; nitrogen-containing hydrocarbon-based solvents such as nitromethane, nitrobenzene, and acetonitrile; ether-based solvents such as diethyl ether, tetrahydrofuran, and diethylene glycol ethyl methyl ether; and the like. Among these, ether-based solvents are preferable since ether-based solvents are versatile in industrial applications, are inert during the polymerization reaction, and advantageously dissolve a polymer and the like, for example.

The solvent is normally used in an amount of 0.1 to 100 parts by weight, preferably 0.5 to 20 parts by weight, and more preferably 1 to 10 parts by weight, based on 1 part by weight of the cyclic olefin. If the amount of the solvent is too large, a decrease in productivity may occur. If the amount of the solvent is too small, the solution viscosity after polymerization may increase to a large extent, and the handling capability may deteriorate.

The polymerization temperature is not particularly limited. The polymerization temperature is normally −30 to +200° C., preferably 0 to 180° C., and more preferably 50 to 100° C. The polymerization time may be determined depending on the reaction scale. The polymerization time is normally 1 minute to 100 hours, preferably 30 minutes to 24 hours, and more preferably 1 to 10 hours. The polymerization reaction according to one embodiment of the invention proceeds very quickly as compared with a known polymerization reaction, and ensures excellent productivity.

A molecular weight modifier may be added to the reaction solution in advance in order to adjust the molecular weight of the polymer. Examples of the molecular weight modifier include a compound that includes a vinyl group, and the like. Examples of the compound that includes a vinyl group (vinyl compound) include, but are not limited to, α-olefins such as 1-butene, 1-pentene, 1-hexene, and 1-octene; styrenes such as styrene and vinyl toluene; ethers such as ethyl vinyl ether, isobutyl vinyl ether, and allyl glycidyl ether; halogen-containing vinyl compounds such as allyl chloride; oxygen-containing vinyl compounds such as glycidyl methacrylate; nitrogen-containing vinyl compounds such as acrylamide; nonconjugated dienes such as 1,4-pentadiene, 1,4-hexadiene, 1,5-hexadiene, 1,6-heptadiene, 2-methyl-1,4-pentadiene, and 2,5-dimethyl-1,4-hexadiene; conjugated dienes such as 1,3-butadiene, 2-methyl-1,3-butadiene, 2,3-dimethyl-1,3-butadiene, 1,3-pentadiene, and 1,3-hexadiene; and the like. Among these, α-olefins are preferable due to a capability to easily adjust the molecular weight of the polymer.

The amount of the vinyl compound may be appropriately selected corresponding to the molecular weight of the target polymer. The vinyl compound is normally used in a ratio of 0.1 to 10 mol % with respect to the cyclic olefin.

The vinyl compound may be added again to the reaction solution so that the ruthenium carbene complex is released from the terminal of the polymer to terminate the polymerization reaction.

The (polystyrene-reduced) number average molecular weight of the ring-opening polymer obtained by the ring-opening metathesis polymerization reaction determined by gel permeation chromatography is preferably 1000 to 500,000, and more preferably 3000 to 200,000.

(4) Hydrogenation Reaction

The carbon-carbon double bonds included in the main chain of the ring-opening metathesis polymer are hydrogenated to obtain a hydrogenated ring-opening metathesis polymer. The hydrogenation reaction may be performed in the presence of a hydrogenation catalyst using hydrogen gas.

A homogeneous hydrogenation catalyst, a heterogeneous hydrogenation catalyst, or the like may be used as the hydrogenation catalyst. An arbitrary hydrogenation catalyst normally used when hydrogenating an olefin compound may be appropriately used.

Examples of the homogeneous hydrogenation catalyst include Ziegler catalysts such as a combination of a transition metal compound and an alkali metal compound, such as a combination of cobalt acetate and triethylaluminum, a combination of nickel acetylacetonate and triisobutylaluminum, a combination of titanocene dichloride and n-butyllithium, a combination of zirconocene dichloride and sec-butyllithium, and a combination of tetrabutoxytitanate and dimethyl magnesium; the above ruthenium compound catalysts; dichlorobis(triphenylphosphine)palladium; noble metal (e.g., ruthenium) complex catalysts such as those described in JP-A-7-2929, JP-A-7-149823, JP-A-11-109460, JP-A-11-158256, JP-A-11-193323, and the like; and the like.

Examples of the heterogeneous hydrogenation catalyst include a hydrogenation catalyst obtained by causing a metal such as nickel, palladium, platinum, rhodium, or ruthenium to be supported on a carrier such as carbon, silica, diatomaceous earth, alumina, or titanium oxide. Specific examples of the heterogeneous hydrogenation catalyst include nickel/silica, nickel/diatomaceous earth, nickel/alumina, palladium/carbon, palladium/silica, palladium/diatomaceous earth, palladium/alumina, and the like.

These hydrogenation catalysts may be used either alone or in combination.

The hydrogenation reaction is normally effected in an organic solvent. The organic solvent may be appropriately selected taking account of the solubility of the hydrogenated product. An organic solvent similar to the polymerization solvent may be used.

It is preferable to utilize the ruthenium compound used for the polymerization reaction directly as the hydrogenation catalyst since the operation can be simplified, and the carbon-carbon double bonds included in the main chain of the polymer can be more selectively hydrogenated. In this case, the hydrogenation reaction can be continuously performed by subjecting the reaction mixture obtained by the polymerization reaction to a hydrogen atmosphere. It is more preferable to use the heterogeneous catalyst in combination with the ruthenium compound when effecting the hydrogenation reaction. The amount of the heterogeneous catalyst is not particularly limited, but is normally 0.001 to 100 parts by weight based on the amount of the ring-opening polymer.

The hydrogenation reaction conditions may be appropriately selected taking account of the type of hydrogenation catalyst and the like. The hydrogenation catalyst is normally used in an amount of 0.01 to 50 parts by weight, preferably 0.05 to 20 parts by weight, and more preferably 0.1 to 10 parts by weight, based on 100 parts by weight of the ring-opening metathesis polymer.

The hydrogenation temperature is normally −10 to +250° C., preferably −10 to +210° C., and more preferably 0 to 200° C. The hydrogenation temperature may be increased in a stepwise manner. If the hydrogenation temperature is less than −10° C., the reaction rate may decrease. If the hydrogenation temperature exceeds 250° C., side reactions may easily occur.

The hydrogen pressure is normally 0.01 to 10 MPa, preferably 0.05 to 8 MPa, and more preferably 0.1 to 5 MPa. The hydrogen pressure may be increased in a stepwise manner. If the hydrogen pressure is less than 0.01 MPa, the reaction (hydrogenation) rate may decrease. If the hydrogen pressure is exceeds 10 MPa, a pressure-resistant reactor may be required.

The hydrogenation time is appropriately selected in order to control the degree of hydrogenation. The hydrogenation time is normally 0.1 to 10 hours.

The carbon-carbon double bonds included in the main chain of the ring-opening metathesis polymer are hydrogenated in a ratio of 60% or more, preferably 90% or more, more preferably 95% or more, still more preferably 98% or more, and particularly preferably 99% or more.

The hydrogenation rate can be determined by comparing the peak intensity in the $^1$H-NMR spectrum of the ring-opening metathesis polymer that is attributed to the carbon-carbon double bonds with the peak intensity in the $^1$H-NMR spectrum of the hydrogenated ring-opening metathesis polymer that is attributed to the carbon-carbon double bonds.

After completion of the hydrogenation reaction, the catalyst residue and the solvent may be removed, as required. The catalyst residue may be removed using a method that pours the reaction solution (in which the ruthenium compound is normally uniformly dissolved) into a large amount of a poor solvent, and collects a solid, a method that washes the reaction solution with an aqueous solution of an organic acid or an inorganic acid, a method that brings the reaction solution into contact with a solid adsorbent such as silica gel, alumina, an ion-exchange resin, or activated carbon, and removes the solid adsorbent by filtration, a method that charges a column with a solid adsorbent, and brings the resin solution into contact with the solid adsorbent, or the like.

When using the heterogeneous catalyst in combination with the ruthenium compound, it is preferable to remove the heterogeneous catalyst from the reaction solution by filtration before performing the above treatment (e.g., collection of a solid, washing with an aqueous solution, or contact with an adsorbent).

The production method according to one embodiment of the invention can industrially advantageously produce the hydrogenated ring-opening metathesis polymer that exhibits excellent light transmittance.

For example, when a resin film is formed on a glass substrate using the hydrogenated ring-opening metathesis polymer, and the spectral transmittance (wavelength: 400 nm) of the resin film is measured using a spectrophotometer (as described later), the resin film has a spectral transmittance of 98% or more.

2) Resin Composition

A resin composition according to one embodiment of the invention includes a hydrogenated ring-opening metathesis polymer produced by the production method according to one embodiment of the invention. Therefore, the resin composition according to one embodiment of the invention exhibits excellent optical properties, electrical properties, mechanical properties, heat resistance, light resistance, and the like, and can suitably be used to produce a pixel, separation film and a planarization film of an organic electroluminescence (EL) device, a gate insulating film and a protective film of a thin film transistor (TFT), and the like.

The resin composition according to one embodiment of the invention may be prepared by dissolving or dispersing a hydrogenated ring-opening metathesis polymer produced by the production method according to one embodiment of the invention and an optional additive corresponding to the application in an appropriate solvent.

Examples of the additive include a crosslinking agent, inorganic fine particles, a surfactant, an antioxidant, a coloring agent such as a pigment and a dye, an adhesion improver, a light stabilizer, a fluorescent whitening agent, a UV absorber, a radiation-sensitive compound, an antistatic agent, and the like.

Examples of the solvent include alcohols such as methanol, ethanol, propanol, butanol, and 3-methoxy-3-methylbutanol; cyclic ethers such as tetrahydrofuran and dioxane; cellosolve esters such as methyl cellosolve acetate and ethyl cellosolve acetate; glycol ethers such as ethylene glycol monoethyl ether, ethylene glycol monopropyl ether, ethylene glycol mono-t-butyl ether, diethylene glycol ethyl methyl ether, propylene glycol monoethyl ether, and propylene glycol monomethyl ether acetate (PGMEA); aromatic hydrocarbons such as benzene, toluene, and xylene; ketones such as methyl ethyl ketone, cyclopentanone, cyclohexanone, 2-heptanone, and 4-hydroxy-4-methyl-2-pentanone; esters such as ethyl 2-hydroxypropionate, ethyl 2-hydroxy-2-methylpropionate, ethyl 2-hydroxy-2-methylpropionate, ethyl ethoxyacetate, methyl hydroxyacetate, methyl 2-hydroxy-3-methylbutanoate, methyl 3-methoxypropionate, methyl 3-ethoxypropionate, ethyl acetate, butyl acetate, and ethyl lactate; aprotic polar solvents such as N-methylformamide, N,N-dimethylformamide, N-methyl-2-pyrrolidone, N-methylacetamide, N,N-dimethylacetamide, dimethyl sulfoxide, and γ-butyrolactone; and the like.

These solvents may be used either alone or in combination.

The amount of the solvent is determined taking account of the application. The solvent is normally used in an amount of 20 to 10,000 parts by weight, preferably 50 to 5000 parts by weight, and more preferably 100 to 1000 parts by weight, based on 100 parts by weight of the hydrogenated ring-opening metathesis polymer.

Each component may be dissolved or dispersed in the solvent using an arbitrary method. For example, each component may be dissolved or dispersed in the solvent using a stirring method using a stir bar and a magnetic stirrer, or a method using a high-speed homogenizer, a disperser, a planet stirrer, a biaxial stirrer, a ball mill, a triple roll, or the like. After dissolving or dispersing each component in the solvent, the solution may be filtered through a filter having a pore size of about 0.5 μm for example.

The solid content in the resin composition according to one embodiment of the invention is normally 1 to 70 wt %, preferably 2 to 60 wt %, and more preferably 5 to 50 wt %. When the solid content is within the above range, the dissolution stability, applicability to a substrate, the uniformity and the flatness of the resulting resin film, and the like are well-balanced.

Specific examples of usage of the resin composition according to one embodiment of the invention are described below.

Gate Insulating Film

The gate insulating film of a TFT may be produced as described below, for example.

The TFT is a transistor that includes a semiconductor film, a gate electrode, a source electrode, a drain electrode, and a gate insulating film on a substrate.

The TFT is roughly classified into a bottom gate-type TFT (i.e., a TFT in which the gate electrode is provided on the substrate, and the source electrode and the drain electrode that are connected through the semiconductor film are provided on the gate electrode through the gate insulating film) and a top gate-type TFT (i.e., a TFT in which the source electrode and the drain electrode that come in contact with the semiconductor film are provided on the substrate, and the gate electrode is provided on the source electrode and the drain electrode through the gate insulating film).

The gate insulating film may be formed by a wet method or a dry method on the substrate on which the gate electrode is formed (bottom gate-type TFT), or the substrate on which the source electrode and the drain electrode that come in contact with the semiconductor film are formed (top gate-type TFT), using the resin composition according to one embodiment of the invention. It is preferable to use the wet method.

Examples of the wet method include a spray coating method, a spin coating method, a blade coating method, a dip coating method, a casting method, a roll coating method, a bar coating method, a die coating method, a Langmuir-Blodgett (LB) method, a screen printing method, an ink-jet printing method, and the like. A printing method referred to as soft lithography (e.g., microcontact printing or micro molding) or the like may also be applied.

The resulting thin film is normally dried at 50 to 150° C. for 0.5 to 10 minutes depending on the solvent, the ratio of the components, and the like, and optionally post-baked. The thin film may be post-baked at a specific temperature (e.g., 150 to 250° C.) for a specific time (e.g., 5 to 30 minutes on a hot plate, or 30 to 90 minutes in an oven) using a heating device (e.g., hot plate or oven).

The thickness of the resulting gate insulating film is not particularly limited as long as the gate insulating film exhibits insulating properties, but is normally 20 nm to 1 μm, and preferably 80 to 500 nm. The thickness of the gate insulating film be as small as possible in order to deal with a reduction in device size.

TFT Protective Film

A protective film is normally formed when producing the TFT in order prevent a deterioration and breakage. The protective film may preferably be formed using the resin composition according to one embodiment of the invention.

The protective film is formed to come in contact with the gate insulating film, the semiconductor film, the source electrode, and the drain electrode formed on the substrate. The protective film may be formed using an arbitrary method. For example, the protective film may be formed in the same manner as the gate insulating film. The protective film may also be formed using a film lamination method.

When using the film lamination method, the resin composition according to one embodiment of the invention is applied to a base for forming a stage film (e.g., resin film or metal film), and heating and drying the resin composition to obtain a stage film. The stage film is stacked on the substrate on which the gate electrode, the gate insulating film, the semiconductor film, the source electrode, and the drain electrode are formed.

The heating/drying conditions are determined taking account of the type of resin composition and the like. The heating temperature is normally 30 to 150° C., and the heating time is normally 0.5 to 90 minutes.

The film lamination method may be implemented using a compression-bonding device such as a press laminator, a press, a vacuum laminator, a vacuum press, or a roll laminator.

The thickness of the protective film is not particularly limited, but is preferably 0.1 to 100 μm, more preferably 0.5 to 50 μm, and still more preferably 0.5 to 30 μm.

A radiation-sensitive compound and/or a crosslinking agent may be added to the resin composition as an additive to pattern and/or crosslink the protective film in the same manner as a pixel separation film of an organic EL device (described later).

Since the resulting protective film exhibits excellent adhesion to the gate insulating film, the semiconductor film, the source electrode film, and the drain electrode, the resulting thin film transistor exhibits excellent reliability.

Pixel Separation Film and the Like of Organic EL Device

An organic EL device normally includes a transparent substrate, a planarization film, an anode, a pixel separation film, an organic emitting layer, and a cathode. The pixel separation film and the planarization film may be formed using the resin composition according to one embodiment of the invention.

The pixel separation film of the organic EL device is formed as described below, for example.

Specifically, the resin composition according to one embodiment of the invention is applied to the transparent substrate on which the anode is formed in the same manner as in the case of forming the gate insulating film, and dried to form a resin film. The resin film is patterned to have the desired pattern using a photolithographic process or the like to obtain a pixel separation film having a tapered shape.

It is preferable that the resin composition according to one embodiment of the invention include a radiation-sensitive compound and/or a crosslinking agent as an additive. The radiation-sensitive compound and the crosslinking agent disclosed in JP-A-2009-295374 may preferably be used.

When the resin composition according to one embodiment of the invention includes the radiation-sensitive compound, the resin film can be patterned to have the desired pattern by applying active radiation to the resin film to form a latent image pattern in the resin film, and bringing a developer into contact with the resin film to visualize the latent image pattern.

The active radiation is not particularly limited as long as the active radiation can activate the radiation-sensitive compound to change the alkali-solubility of the resin composition according to one embodiment of the invention. Examples of the active radiation include beams such as ultraviolet rays, ultraviolet rays having a single wavelength (e.g., g-line and i-line), KrF excimer laser light, and ArF excimer laser light; particle rays such as electron beams; and the like.

When forming the latent image pattern by selectively applying the active radiation in a pattern, the above beams may be applied through a mask pattern using a reduction projection aligner or the like, or the pattern may be drawn using the particle rays, for example.

An aqueous solution of an alkaline compound may be used as the developer. Examples of the alkaline compound include inorganic compounds such as sodium hydroxide and potassium hydroxide; and organic compounds such as tetramethylammonium hydroxide and tetraethylammonium hydroxide. The aqueous medium included in the aqueous solution of the alkaline compound may be water, or a water-soluble organic solvent such as methanol or ethanol.

The developer may be brought into contact with the resin film having the latent image pattern using a puddle method, a spray method, a dipping method, or the like. The development temperature is normally 5 to 55° C., and the development time is normally 30 to 180 seconds.

After forming the patterned resin film on the transparent substrate on which the patterned anode is formed, it is preferable to crosslink the resin. The resin film formed on the substrate may be crosslinked using an appropriate method taking account of the type of crosslinking agent. The resin film is normally crosslinked by heating. The resin film may be heated using a hot plate, an oven, or the like. The heating temperature is normally 180 to 250° C., and the heating time may be appropriately selected taking account of the thickness of the resin film and the like.

The thickness of the resulting pixel separation film is normally 0.2 to 10 μm, preferably 0.25 to 8 μm, and more preferably 0.3 to 6 μm.

Since the pixel separation film formed as described above exhibits excellent transparency, workability, adhesion, and low outgassing properties, a situation in which the amount of light emitted from the organic EL device decreases with the lapse of time at a high temperature does not occur, it is possible to efficiently produce a reliable organic EL device having high luminance.

The planarization film of the organic EL device may also be formed using the resin composition according to one embodiment of the invention. When the planarization film is formed using the resin composition according to one embodiment of the invention, since the pixel separation film and the planarization film exhibit low outgassing properties, a more reliable organic EL display can be obtained.

The planarization film may be formed using the resin composition according to one embodiment of the invention by applying the resin composition according to one embodiment of the invention to the surface of a substrate, drying the resin composition to form a resin film, patterning the resin film using a photolithographic process, and optionally crosslink the resin film, for example.

EXAMPLES

The invention is further described below by way of examples. Note that the invention is not limited to the following examples.

Note that the units "parts" and "%" used in connection with the examples respectively refer to "parts by weight" and "wt %" unless otherwise indicated.

The properties were evaluated using the following methods.

Polymerization Conversion Rate

The residual monomer content in the reaction solution was measured by gas chromatography after completion of polymerization, and the polymerization conversion rate was calculated from the measured value.

Hydrogenation Rate

The number of moles of hydrogenated carbon-carbon double bonds was measured using a $^1$H-NMR spectrum, and the ratio with respect to the number of moles of carbon-carbon double bonds before hydrogenation was calculated to determine the hydrogenation rate of the hydrogenated cyclic olefin polymer.

Weight Average Molecular Weight and Number Average Molecular Weight

The polystyrene-reduced weight average molecular weight and the polystyrene-reduced number average molecular weight of the cyclic olefin polymer and the hydrogenated cyclic olefin polymer were determined by gel permeation chromatography ("HLC-8020" manufactured by Tosoh Corporation, column: TSKgel Super H2000, TSKgel Super H4000, and TSKgel Super H5000). Tetrahydrofuran (THF) was used as an eluant.

(1) Examples in which Ruthenium Compound (I) was Used as Polymerization Catalyst The following monomers and catalysts were used in the examples and comparative examples.

Monomer

Monomer (I-1): 4-hydroxycarbonyltetracyclo[6.2.1.1$^{3,6}$.0$^{2,7}$]dodec-9-ene (TCDC)

Monomer (I-2): 4-methyl-4-hydroxycarbonyltetracyclo[6.2.1.1$^{3,6}$.0$^{2,7}$]dodec-9-ene (MTCDC)

Monomer (I-3): 2,3-dihydroxycarbonylbicyclo[2.2.1]hept-5-ene (NDC) (corresponding to 5,6-dicarboxynorbornene)
Monomer (I-4): N-(2-ethylhexyl)bicyclo[2.2.1]hept-5-ene-2,3-dicarboxyimide (N2EHI)
Monomer (I-5): N-(1-ethylhexyl)bicyclo[2.2.1]hept-5-ene-2,3-dicarboxyimide (N1EHI)
Monomer (I-6): methyl N-(endo-bicyclo[2.2.1]hept-5-ene-2,3-diyldicarbonyl)aspartate (NDMI)
Monomer (I-7): N-phenylbicyclo[2.2.1]hept-5-ene-2,3-dicarboxyimide (NBPI)

Catalyst

Catalyst (I-A1): 1,3-bis(2,4,6-trimethylphenyl)-4,5-dihydroimidazol-2-ylidene[2-(isopropoxy)-5-(N,N-dimethylaminosulfonyl)phenyl]methyleneruthenium chloride (synthesized using the method described in JP-T-2008-546846)
Catalyst (I-A2): [2-(isopropoxy)-5-(N,N-dimethylaminosulfonyl)phenyl]methylene (tricyclohexylphosphine)ruthenium dichloride (synthesized using the method described in JP-T-2008-546846)
Catalyst (I-X1): (1,3-dimesitylimidazolyn-2-ylidene)(tricyclohexylphosphine) benzylideneruthenium dichloride (synthesized using the method described in Org. Lett., Vol. 1, p. 953, 1999)
Catalyst (I-X2): (3-phenylinden-1-ylidene)(1,3-dimesityl-4-imidazolin-2-ylidene) (tricyclohexylphosphine)ruthenium dichloride (synthesized using the method described in Organometallics, Vol. 18, p. 5416, 1999)
Catalyst (I-X3): (2-thienylmethylene)(1,3-dimesityl-4-imidaxolin-2-ylidene) (tricyclohexylphosphine)ruthenium dichloride (synthesized using the method described in JP-T2011-516526)
Catalyst (I-X4): (2-thienylmethylene)(1,3-dimesityl-4,5-dimethyl-4-imidazolin-2-ylidene)(tricyclohexylphosphine) ruthenium dichloride (synthesized using the method described in JP-T2011-516526)

Example I-1

A pressure-resistant glass reactor in which the internal atmosphere had been replaced with nitrogen, was charged with 60 parts of TCDC, 40 parts of N1EHI, 2.5 parts of 1,5-hexadiene, 0.1 parts of the catalyst I-A1, and 400 parts of diethylene glycol ethyl methyl ether. The mixture was stirred at 80° C. for 3 hours to obtain a polymerization solution including a ring-opening polymer I-1.

The polymerization conversion rate of the ring-opening polymer I-1 was 99.4%, The ring-opening polymer I-1 had a weight average molecular weight (Mw) of 5400, a number average molecular weight (Mn) of 3780, and a molecular weight distribution (Mw/Mn) of 1.43.

An autoclave was charged with the polymerization solution, and the polymerization solution was stirred at 150° C. for 1 hour under a hydrogen pressure of 4 MPa to effect a hydrogenation reaction. The resulting solution was filtered through a funnel precoated with Radiolite to obtain 101 parts of a hydrogenated ring-opening polymer I-1.

The hydrogenated ring-opening polymer I-1 had a weight average molecular weight (Mw) of 6350, a number average molecular weight (Mn) of 4342, a molecular weight distribution (Mw/Mn) of 1.46, and a hydrogenation rate of 90.0% or more.

Example I-2

102 parts of a hydrogenated ring-opening polymer I-2 was obtained in the same manner as in Example I-1, except that 40 parts of NBP1 was used instead of 40 parts of N1EHI.

The hydrogenated ring-opening polymer I-2 had a hydrogenation rate of 90.0% or more, a weight average molecular weight (Mw) of 5460, a number average molecular weight (Mn) of 3620, and a molecular weight distribution (Mw/Mn) of 1.50.

Examples I-3 to I-20

Hydrogenated ring-opening polymers I-3 to I-20 were obtained in the same manner as in Example I-1, except that the monomer and the catalyst were changed as shown in Table 1-1.

Comparative Example I-1

A polymerization solution including a ring-opening polymer I-r1, was obtained in the same manner as in Example I-1, except that 0.1 parts of the catalyst I-X1 was used instead of 0.1 parts of the catalyst I-A1.

An autoclave was charged with the polymerization solution, and the polymerization solution was stirred at 150° C. for 3 hours under a hydrogen pressure of 4 MPa to effect a hydrogenation reaction. The resulting solution was filtered through a funnel precoated with Radiolite to obtain a hydrogenated ring-opening polymer I-r1.

The hydrogenated ring-opening polymer I-r1 had a hydrogenation rate of 90.0% or more, a weight average molecular weight (Mw) of 6480, a number average molecular weight (Mn) of 4330, and a molecular weight distribution (Mw/Mn) of 1.50.

Comparative Example I-2

A hydrogenated ring-opening polymer I-r2 was obtained in the same manner as in Comparative Example I-1, except that 40 parts of NBP1 was used instead of 40 parts of N1EHI.

The polymerization conversion rate of the hydrogenated ring-opening polymer I-r2 was 90.0% or more. The hydrogenated ring-opening polymer I-r2 had a hydrogenation rate of 90.0% or more, a weight average molecular weight (Mw) of 5290, a number average molecular weight (Mn) of 3470, and a molecular weight distribution (Mw/Mn) of 1.53.

Comparative Examples I-3 to I-11

Hydrogenated ring-opening polymers I-r3 to I-r11 were obtained in the same manner as in Comparative Example I-1, except that the monomer and the catalyst shown in Table 1-2 in the amounts shown in Table 1-2.

The polymerization conversion rate of the hydrogenated ring-opening polymers I-3 to I-20 and I-r3 to I-r11 was 90.0% or more. The hydrogenated ring-opening polymers I-r3 to I-r11 had a hydrogenation rate of 90.0% or more, a weight average molecular weight (Mw) of 5000 to 7000, a number average molecular weight (Mn) of 3000 to 5000, and a molecular weight distribution (Mw/Mn) of 1.0 to 2.3.

Preparation of Resin Composition

The hydrogenated ring-opening polymers I-1 to I-20 and I-r1 to I-r11 obtained in the examples and the comparative examples were diluted with diethylene glycol ethyl methyl ether to obtain resin compositions I-1 to I-20 and I-r1 to I-r11 (solid content: 20%), respectively.

Measurement of Light Transmittance

Each of the resin compositions I-1 to I-20 and I-r1 to I-r11 was spin-coated onto a glass substrate ("Corning 1737" manufactured by Corning Incorporated), and prebaked at 90° C. for 2 minutes using a hot plate to obtain a resin film. The resin film was baked at 230° C. for 1 hour in an oven, (atmosphere: nitrogen) to obtain a laminate having a thickness of 3.0 μm. The light transmittance (wavelength: 400 nm) of the laminate was measured using a spectrophotometer ("V-560" manufactured by JASCO Corporation).

A case where the light transmittance was 97% or more was evaluated as "A" (Acceptable), a case where the light transmittance was 95% or more and less than 97% was evaluated as "B" (Fair), and a case where the light transmittance was less than 95% was evaluated as "C" (Unacceptable).

The evaluation results are shown in Tables 1-1 and 1-2.

Measurement of Relative Permittivity

Each of the resin compositions I-1 to I-20 and I-r1 to I-r11 was spin-coated onto a silicon wafer, and prebaked at 100° C. for 2 minutes using a hot plate to obtain a resin film having a thickness of 0.12 μm. The resin film was baked at 230° C. for 1 hour in a nitrogen atmosphere to obtain a sample (i.e., the silicon wafer on which the resin film was formed). The relative permittivity of the resin film was measured at 10 KHz (room temperature) in accordance with JIS C 6481. It is preferable that the relative permittivity of the resin film be as low as possible.

A case where the relative permittivity was less than 2.6 was evaluated as "A" (Acceptable), a case where the relative permittivity was 2.6 or more and less than 2.8 was evaluated as "B" (Fair), and a case where the relative permittivity was 2.8 or more was evaluated as "C" (Unacceptable).

The evaluation results are shown in Tables 1-1 and 1-2.

Measurement of Chemical Resistance

Each of the resin compositions I-1 to I-20 and I-r1 to I-r11 was spin-coated onto a silicon wafer, and prebaked at 100° C. for 2 minutes using a hot plate to obtain a resin film. The resin film was baked at 230° C. for 1 hour in a nitrogen atmosphere to obtain a sample (samples 1 to 20 and r1 to r1) (i.e., the silicon wafer on which the resin film having a thickness of 3.0 μm was formed). The sample was immersed in a stripper (50° C.) ("ST-106" manufactured by Tokyo Ohka Kogyo Co., Ltd.) for 1 minute, washed with purified water for 10 seconds, and dried by blowing air, and a change in thickness was measured to calculate the initial thickness change ratio. It is preferable that the change ratio be as close to 100% as possible.

A case where the chemical resistance was less than 107% was evaluated as "A" (Acceptable), a case where the chemical resistance was 107% or more and less than 110% was evaluated as "B" (Fair), and a case where the chemical resistance was 110% or more was evaluated as "C" (Unacceptable).

The evaluation results are shown in Tables 1-1 and 1-2.

Measurement of Plasma Resistance

Each of the samples I-1 to I-20 and I-r1 to I-r11 as described above was treated with plasma (argon flow rate: 300 sccm, RF output: 300 W) at room temperature for 10 seconds using a sputtering apparatus "i-Miller (CFS-4EP-LL)" (manufactured by Shibaura Eletec Corporation). A change in thickness was measured to calculate the initial thickness change ratio. It is preferable that the change ratio be as close to 100% as possible.

A case where the plasma, resistance was 94% or more was evaluated as "A" (Acceptable), a case where the plasma resistance was 90% or more and less than 94% was evaluated as "B" (Fair), and a case where the plasma resistance was less than 90% was evaluated as "C" (Unacceptable).

The evaluation results are shown in Tables 1-1 and 1-2.

TABLE 1-1

| | | Example | | | | | | | | | |
|---|---|---|---|---|---|---|---|---|---|---|---|
| | | I-1 | I-2 | I-3 | I-4 | I-5 | I-6 | I-7 | I-8 | I-9 | I-10 |
| Catalyst | | I-A1 | I-A1 | I-A2 | I-A2 | I-A2 | I-A2 | I-A2 | I-A2 | I-A1 | I-A1 |
| Monomer | I-1 | 60 | 60 | 70 | 50 | 70 | 50 | 70 | 50 | 70 | 50 |
| (parts by | I-2 | | | | | | | | | | |
| weight) | I-3 | | | | | | | | | | |
| | I-4 | | | 30 | 50 | | | | | 30 | 50 |
| | I-5 | 40 | | | | | | | | | |
| | I-6 | | | | | 30 | 50 | | | | |
| | I-7 | | 40 | | | | | 30 | 50 | | |
| Hydrogenated polymer | | I-1 | I-2 | I-3 | I-4 | I-5 | I-6 | I-7 | I-8 | I-9 | I-10 |

TABLE 1-1-continued

|  | | | | | | | | | | |
|---|---|---|---|---|---|---|---|---|---|---|
| Light transmittance | A | A | B | B | B | B | A | A | A | B |
| Relative permittivity | A | A | A | B | B | B | A | A | A | A |
| Chemical resistance | A | A | A | A | A | A | A | A | A | A |
| Plasma resistance | B | A | A | A | A | A | A | A | A | A |

| | | Example | | | | | | | | | |
|---|---|---|---|---|---|---|---|---|---|---|---|
| | | I-11 | I-12 | I-13 | I-14 | I-15 | I-16 | I-17 | I-18 | I-19 | I-20 |
| Catalyst | | I-A1 | I-A1 | I-A1 | I-A1 | I-A1 | I-A1 | I-A1 | I-A1 | I-A1 | I-A1 |
| Monomer | I-1 | 70 | 50 | 70 | 50 | | | | | | |
| (parts by | I-2 | | | | | 60 | 60 | 60 | | | |
| weight) | I-3 | | | | | | | | 60 | 60 | 60 |
| | I-4 | | | | | 40 | | | 40 | | |
| | I-5 | | | | | | | | | | |
| | I-6 | 30 | 50 | | | | 40 | | | 40 | |
| | I-7 | | | 30 | 50 | | | 40 | | | 40 |
| Hydrogenated polymer | | I-11 | I-12 | I-13 | I-14 | I-15 | I-16 | I-17 | I-18 | I-19 | I-20 |
| Light transmittance | | B | A | A | A | B | A | A | B | A | A |
| Relative permittivity | | A | B | A | A | B | B | A | B | B | B |
| Chemical resistance | | A | A | A | A | A | B | A | A | A | B |
| Plasma resistance | | A | B | A | A | A | A | A | A | B | B |

TABLE 1-2

| | | Comparative Example | | | | | | | | | | |
|---|---|---|---|---|---|---|---|---|---|---|---|---|
| | | I-1 | I-2 | I-3 | I-4 | I-5 | I-6 | I-7 | I-8 | I-9 | I-10 | I-11 |
| Catalyst | | I-X1 | I-X1 | I-X2 | I-X2 | I-X2 | I-X3 | I-X3 | I-X3 | I-X4 | I-X4 | I-X4 |
| Monomer | 1 | 60 | 60 | 60 | 60 | 60 | 60 | 60 | 60 | 60 | 60 | 60 |
| (parts by weight) | 2 | | | | | | | | | | | |
| | 3 | | | | | | | | | | | |
| | 4 | | | 40 | | | 40 | | | 40 | | |
| | 5 | 40 | | | | | | | | | | |
| | 6 | | | | 40 | | | 40 | | | 40 | |
| | 7 | | 40 | | | 40 | | | 40 | | | 40 |
| Hydrogenated polymer | | I-r1 | I-r2 | I-r3 | I-r4 | I-r5 | I-r6 | I-r7 | I-r8 | I-r9 | I-r10 | I-r11 |
| Light transmittance | | C | C | C | C | B | C | C | B | C | C | B |
| Relative permittivity | | C | C | C | C | C | B | C | C | C | C | B |
| Chemical resistance | | C | C | C | C | B | C | C | C | C | C | B |
| Plasma resistance | | C | B | B | B | C | C | C | B | C | C | C |

As is clear from the results shown in Tables 1-1 and 1-2, the hydrogenated polymers I-1 to I-20 of Examples 1 to 20 that were obtained by subjecting the cyclic olefin to ring-opening polymerization using the ruthenium compound represented by the formula (I) as the polymerization catalyst, and hydrogenating the resulting ring-opening polymer, exhibited a light transmittance (wavelength: 400 nm), relative permittivity, chemical resistance, and plasma resistance equal to or better than those of the hydrogenated polymers I-r1 to I-r11 of Comparative Examples I-1 to I-11.

(2) Examples in which Ruthenium Compound (II) was Used as Polymerization Catalyst

Example II-1

A pressure-resistant glass reactor in which the internal atmosphere had been replaced with nitrogen, was charged with 70 parts of 4-hydroxycarbonyltetracyclo[6.2.1.1$^{3,6}$.0$^{2,7}$]dodec-9-ene (TCDC), 30 parts of N-(2-ethylhexyl)bicyclo[2.2.1]hept-5-ene-2,3-dicarboxyimide, 2.5 parts of 1,5-hexadiene, 0.1 parts of ((1-aza-2-oxocyclopentyl)methylene)(1,3-dimesityl-4-imidazolin-2-ylidene)(tricyclohexylphosphine)ruthenium dichloride, and 300 parts of diethylene glycol ethyl methyl ether. The mixture was stirred at 80° C. for 3 hours to obtain a polymerization solution including a ring-opening polymer II-1.

An autoclave was charged with the polymerization solution, and the polymerization solution was stirred at 150° C. for 1 hour under a hydrogen pressure of 4 MPa to effect a hydrogenation reaction. The resulting solution was filtered through a funnel precoated with Radiolite to obtain 101 parts of a hydrogenated ring-opening polymer II-1.

Examples II-2 to II-25 and Comparative Examples II-1 to II-9

Hydrogenated ring-opening polymers II-2 to II-25 and II-r1 to II-r9 were obtained in the same manner as in Example II-1, except that the monomer and the catalyst were changed as shown in Tables 2-1 and 2-2.

Monomer (II-1): 4-hydroxycarbonyltetracyclo[6.2.1.1$^{3,6}$.0$^{2,7}$]dodec-9-ene Monomer (II-2): 4-methyl-4-hydroxycarbonyltetracyclo[6.2.1.1$^{3,6}$.0$^{2,7}$]dodec-9-ene Monomer (II-3): 2,3-dihydroxycarbonylbicyclo[2.2.1]hept-5-ene (corresponding to 5,6-dicarboxynorbornene)

Monomer (II-4): N-(2-ethylhexyl)bicyclo[2.2.1]hept-5-ene-2,3-dicarboxyimide

Monomer (II-5): methyl N-(endo-bicyclo[2.2.1]hept-5-ene-2,3-diyldicarbonyl)aspartate Monomer (II-6): N-phenylbicyclo[2.2.1]hept-5-ene-2,3-dicarboxyimide Catalyst (II-A1): (1,3-bis(2,6-diisopropylphenyl)imidazolidin-2-ylidene) ((2-methyl-3-oxo-4-(pentafluorophenylcarbonyl)-3,4-dihydro-2H-benzo[b][1,4]oxazin-8-yl)methylene)ruthenium dichloride (see WO2012/013208 (Compound No. P47))

Catalyst (II-A2): (1,3-bis(2,6-diisopropylphenyl)imidazolin-2-ylidene) ((2-ethyl-3-oxo-3,4-dihydro-2H-benzo[b][1,4]oxazin-8-yl)methylene)ruthenium dichloride (see WO2012/013208 (Compound No. P33))

Catalyst (II-A3): (1,3-bis(2,6-diisopropylphenyl)imidazolin-2-ylidene) ((2-ethyl-4-(isobutoxycarbonyl)-3-oxo-3,4-dihydro-2H-benzo[b][1,4]oxazin-8-yl) methylene)ruthenium dichloride (see WO2012/013208 (Compound No. P34))

Catalyst (II-X1): (3-phenylinden-1-ylidene)(1,3-dimesityl-4-imidazolin-2-ylidene) (tricyclohexylphosphine)ruthenium dichloride (synthesized using the method described in Organometallics, Vol. 18, p. 5416, 1999)

Catalyst (II-X2): (2-thienylmethylene)(1,3-dimesityl-4-imidazolin-2-ylidene) (tricyclohexylphosphine)ruthenium dichloride (synthesized using the method described in JP-T2011-516526)

Catalyst (II-X3): (2-thienylmethylene)(1,3-dimesityl-4,5-dimethyl-4-imidazolin-2-ylidene)(tricyclohexylphosphine) ruthenium dichloride (synthesized using the method described in JP-T2011-516526)

The polymerization conversion rate of the hydrogenated ring-opening polymers II-1 to II-25 and II-r1 to II-r9 was 90.0% or more. The hydrogenated ring-opening polymers II-1 to II-25 and II-r1 to II-r9 had a weight average molecular weight (Mw) of 5000 to 7000, a number average molecular weight (Mn) of 3000 to 5000, a molecular weight distribution (Mw/Mn) of 1.0 to 2.3, and a hydrogenation rate of 90.0% or more.

Preparation of Resin Composition

The hydrogenated ring-opening polymers II-1 to II-25 and II-r1 to II-r9 obtained in the examples and the comparative examples were diluted with diethylene glycol ethyl methyl ether to obtain resin compositions II-1 to II-25 and II-r1 to II-r9 (solid content: 20%), respectively.

Measurement of Light Transmittance

Each of the resin compositions II-1 to II-25 and II-r1 to II-r9 was spin-coated onto a glass substrate ("Corning 1737" manufactured by Corning Incorporated), and prebaked at 90° C. for 2 minutes using a hot plate to obtain a resin film having a thickness of 3.0 μm. The resin film was baked at 230° C. for 1 hour in an oven (atmosphere: nitrogen) to obtain a laminate. The light transmittance (wavelength: 400 nm) of the laminate was measured using a spectrophotometer ("V-560" manufactured by JASCO Corporation).

A case where the light transmittance was 97% or more was evaluated as "A" (Acceptable), a case where the light transmittance was 95% or more and less than 97% was evaluated as "B" (Fair), and a case where the light transmittance was less than 95% was evaluated as "C" (Unacceptable).

The evaluation results are shown in Tables 2-1 and 2-2.

Measurement of Relative Permittivity

Each of the resin compositions II-1 to II-25 and II-r1 to II-r9 was spin-coated onto a silicon wafer, and prebaked at 100° C. for 2 minutes using a hot plate to obtain a resin film having a thickness of 0.12 μm. The resin film was baked at 230° C. for 1 hour in a nitrogen atmosphere to obtain a sample (i.e., the silicon wafer on which the resin film was formed). The relative permittivity of the resin film was measured at 10 KHz (room temperature) in accordance with JIS C 6481. It is preferable that the relative permittivity of the resin film be as low as possible.

A case where the relative permittivity was less than 2.6 was evaluated as "A" (Acceptable), a case where the relative permittivity was 2.6 or more and less than 2.8 was evaluated as "B" (Fair), and a case where the relative permittivity was 2.8 or more was evaluated as "C" (Unacceptable).

The evaluation results are shown in Tables 2-1 and 2-2.

Measurement of Chemical Resistance

Each of the resin compositions II-1 to II-25 and II-r1 to II-r9 was spin-coated onto a silicon wafer, and prebaked at 100° C. for 2 minutes using a hot plate to obtain a resin film having a thickness of 3.0 μm. The resin film was baked at 230° C. for 1 hour in a nitrogen atmosphere to obtain a sample (samples 1 to 25 and r1 to r9) (i.e., the silicon wafer on which the resin film was formed). The sample was immersed in a stripper (50° C.) ("ST-106" manufactured by Tokyo Ohka Kogyo Co., Ltd.) for 1 minute, washed with purified water for 10 seconds, and dried by blowing air, and a change in thickness was measured. It is preferable that the change in thickness be as close to 100% as possible.

A case where the chemical resistance was less than 107% was evaluated as "A" (Acceptable), a case where the chemical resistance was 107% or more and less than 110% was evaluated as "B" (Fair), and a case where the chemical resistance was 110% or more was evaluated as "C" (Unacceptable).

The evaluation results are shown in Tables 2-1 and 2-2.

Measurement of Plasma Resistance

Each of the samples II-1 to II-25 and II-r1 to II-r9 obtained as described above was treated with plasma (argon flow rate: 300 sccm, RF output: 300 W) at room temperature for 10 seconds using a sputtering apparatus "i-Miller (CFS-4EP-LL)" (manufactured by Shibaura Eletec Corporation). A change in thickness was then measured. It is preferable that the change in thickness be as close to 100% as possible.

A case where the plasma resistance was 94% or more was evaluated as "A" (Acceptable), a case where the plasma resistance was 90% or more and less than 94% was evaluated as "B" (Fair), and a case where the plasma resistance was less than 90% was evaluated as "C" (Unacceptable).

The evaluation results are shown in Tables 2-1 and 2-2.

TABLE 2-1

| | | Example | | | | | | | | | | | | |
|---|---|---|---|---|---|---|---|---|---|---|---|---|---|
| | | II-1 | II-2 | II-3 | II-4 | II-5 | II-6 | II-7 | II-8 | II-9 | II-10 | II-11 | II-12 | II-13 |
| Catalyst | | II-A1 | II-A1 | II-A1 | II-A1 | II-A1 | II-A1 | II-A1 | II-A1 | II-A1 | II-A1 | II-A1 | II-A1 | II-A1 |
| Monomer (parts by weight) | II-1 | 70 | 50 | 70 | 50 | 70 | 50 | 60 | | | | | | |
| | II-2 | | | | | | | | 60 | 60 | 60 | | | |
| | II-3 | | | | | | | | | | | 60 | 60 | 60 |
| | II-4 | 30 | 50 | | | | | | 40 | | | 40 | | |
| | II-5 | | | 30 | 50 | | | | | 40 | | | 40 | |
| | II-6 | | | | | 30 | 50 | 40 | | | 40 | | | 40 |
| Hydrogenated polymer | | II-1 | II-2 | II-3 | II-4 | II-5 | II-6 | II-7 | II-8 | II-9 | II-10 | II-11 | II-12 | II-13 |
| Light transmittance | | A | B | B | A | A | A | A | B | A | A | B | A | A |
| Relative permittivity | | A | A | A | B | A | A | A | A | B | B | A | B | B |
| Chemical resistance | | A | A | A | A | A | A | A | A | A | A | A | A | B |
| Plasma resistance | | A | A | A | A | A | A | A | A | A | A | A | B | B |

| | | Example | | | | | | | | | | | |
|---|---|---|---|---|---|---|---|---|---|---|---|---|---|
| | | II-14 | II-15 | II-16 | II-17 | II-18 | II-19 | II-20 | II-21 | II-22 | II-23 | II-24 | II-25 |
| Catalyst | | II-A2 | II-A2 | II-A2 | II-A2 | II-A2 | II-A2 | II-A3 | II-A3 | II-A3 | II-A3 | II-A3 | II-A3 |
| Monomer (parts by weight) | II-1 | 70 | 50 | 70 | 50 | 70 | 50 | 70 | 50 | 70 | 50 | 70 | 50 |
| | II-2 | | | | | | | | | | | | |
| | II-3 | | | | | | | | | | | | |
| | II-4 | 30 | 50 | | | | | 30 | 50 | | | | |
| | II-5 | | | 30 | 50 | | | | | 30 | 50 | | |
| | II-6 | | | | | 30 | 50 | | | | | 30 | 50 |
| Hydrogenated polymer | | II-14 | II-15 | II-16 | II-17 | II-18 | II-19 | II-20 | II-21 | II-22 | II-23 | II-24 | II-25 |
| Light transmittance | | B | B | B | B | A | A | B | B | A | A | A | A |
| Relative permittivity | | A | B | B | B | A | A | B | B | A | B | A | A |
| Chemical resistance | | A | A | A | A | A | A | A | A | A | A | A | A |
| Plasma resistance | | A | A | A | A | A | A | A | B | B | B | A | A |

TABLE 2-2

| | | Comparative Example | | | | | | | | |
|---|---|---|---|---|---|---|---|---|---|---|
| | | II-1 | II-2 | II-3 | II-4 | II-5 | II-6 | II-7 | II-8 | II-9 |
| Catalyst | | II-X1 | II-X1 | II-X1 | II-X2 | II-X2 | II-X2 | II-X3 | II-X3 | II-X3 |
| Monomer (parts by weight) | II-1 | 60 | 60 | 60 | 60 | 60 | 60 | 60 | 60 | 60 |
| | II-2 | | | | | | | | | |
| | II-3 | | | | | | | | | |
| | II-4 | 40 | | | 40 | | | 40 | | |
| | II-5 | | 40 | | | 40 | | | 40 | |
| | II-6 | | | 40 | | | 40 | | | 40 |
| Hydrogenated polymer | | II-r1 | II-r2 | II-r3 | II-r4 | II-r5 | II-r6 | II-r7 | II-r8 | II-r9 |
| Light transmittance | | C | C | B | C | C | B | C | C | B |
| Relative permittivity | | C | C | C | B | C | C | C | C | B |
| Chemical resistance | | C | C | B | C | C | C | C | C | B |
| Plasma resistance | | B | B | C | C | C | B | C | C | C |

As is clear from the results shown in Tables 2-1 and 2-2, the hydrogenated polymers II-1 to II-25 of the examples that were obtained by subjecting the cyclic olefin to ring-opening polymerization using the ruthenium compound represented by the formula (II) as the polymerization catalyst, and hydrogenating the resulting ring-opening polymer, exhibited a light transmittance (wavelength: 400 nm), relative permittivity, chemical resistance, and plasma resistance equal to or better than those of the hydrogenated polymers II-r1 to II-r9 of the comparative examples.

(3) Examples in which Ruthenium Compound (III) was Used as Polymerization Catalyst Example III-1

A pressure-resistant glass reactor in which the internal atmosphere had been replaced with nitrogen, was charged with 70 parts of 4-hydroxycarbonyltetracyclo[6.2.1.1$^{3,6}$.0$^{2,7}$]dodec-9-ene (TCDC), 30 parts of N-(2-ethylhexyl)bicyclo[2.2.1]hept-5-ene-2,3-dicarboxyimide, 2.5 parts of 1,5-hexadiene, 0.1 parts of ((2-(1-methylethoxy)phenyl)methylene)(1,3-dimesitylimidazolidin-2-ylidene)ruthenium dichloride, and 300 parts of diethylene glycol ethyl methyl ether. The mixture was stirred at 80° C. for 3 hours to obtain a polymerization solution including a ring-opening polymer III-1.

An autoclave was charged with the polymerization solution, and the polymerization solution was stirred at 150° C. for 1 hour under a hydrogen pressure of 4 MPa to effect a hydrogenation reaction. The resulting solution was filtered through a funnel precoated with Radiolite to obtain 101 parts of a hydrogenated ring-opening polymer III-1.

Examples III-2 to III-25 and Comparative Examples III-1 to III-9

Hydrogenated ring-opening polymers III-2 to III-25 and III-r1 to III-r9 were obtained in the same manner as in Example III-1, except that the monomer and the catalyst were changed as shown in Tables 3-1 and 3-2.
Monomer (III-1): 4-hydroxycarbonyltetracyclo[6.2.1.1$^{3,6}$.0$^{2,7}$]dodec-9-ene
Monomer (III-2): 4-methyl-4-hydroxycarbonyltetracyclo[6.2.1.1$^{3,6}$.0$^{2,7}$]dodec-9-ene
Monomer (III-3): 2,3-dihydroxycarbonylbicyclo[2.2.1]hept-5-ene (corresponding to 5,6-dicarboxynorbornene)
Monomer (III-4): N-(2-ethylhexyl)bicyclo[2.2.1]hept-5-ene-2,3-dicarboxyimide
Monomer (III-5): methyl N-(endo-bicyclo[2.2.1]hept-5-ene-2,3-diyldicarbonyl)aspartate
Monomer (III-6): N-phenylbicyclo[2.2.1]hept-5-ene-2,3-dicarboxyimide
Catalyst (III-A1): ((2-(1-methylethoxy)phenyl)methylene)(1,3-dimesitylimidazolidin-2-ylidene)ruthenium dichloride (see Example 5 of JP-T2004-506785)
Catalyst (III-A2): ((2-(1-acetylmethoxy)phenyl)methylene)(1,3-dimesitylimidazolidin-2-ylidene)ruthenium dichloride (see Example 1 of JP-T2010-503713)
Catalyst (III-A3): ((2-(1-methoxycarbonylethoxy)phenyl)methylene)(1,3-dimesitylimidazolidin-2-ylidene)ruthenium dichloride (see Example 1 of JP-T2007-501199)
Catalyst (III-X1): (3-phenylinden-1-ylidene)(1,3-dimesityl-4-imidazolin-2-ylidene) (tricyclohexylphosphine)ruthenium dichloride (synthesized using the method described in Organometallics, Vol. 18, p. 5416, 1999)
Catalyst (III-X2): (2-thienylmethylene)(1,3-dimesityl-4-imidazolin-2-ylidene) (tricyclohexylphosphine)ruthenium dichloride (synthesized using the method described in JP-T2011-516526)
Catalyst (III-X3): (2-thienylmethylene)(1,3-dimesityl-4,5-dimethyl-4-imidazolin-2-ylidene)(tricyclohexylphosphine)ruthenium dichloride (synthesized using the method described in JP-T2011-516526)

The polymerization conversion rate of the hydrogenated ring-opening polymers III-1 to III-25 and III-r1 to III-r9 was 90.0% or more. The hydrogenated ring-opening polymers III-1 to III-25 and III-r1 to III-r9 had a weight average molecular weight (Mw) of 5000 to 7000, a number average molecular weight (Mn) of 3000 to 5000, a molecular weight distribution (Mw/Mn) of 1.0 to 2.3, and a hydrogenation rate of 90.0% or more.

Preparation of Resin Composition

The hydrogenated ring-opening polymers III-1 to III-25 and III-r1 to III-r9 obtained in the examples and the comparative examples were diluted with diethylene glycol ethyl methyl ether to obtain resin compositions III-1 to III-25 and III-r1 to III-r9 (solid content: 20%), respectively.

Measurement of Light Transmittance

Each of the resin compositions III-1 to III-25 and III-r1 to III-r9 was spin-coated onto a glass substrate ("Corning 1737" manufactured by Corning Incorporated), and prebaked at 90° C. for 2 minutes using a hot plate to obtain a resin film having a thickness of 3.0 µm. The resin film was baked at 230° C. for 1 hour in an oven (atmosphere: nitrogen) to obtain a laminate. The light transmittance (wavelength: 400 nm) of the laminate was measured using a spectrophotometer ("V-560" manufactured by JASCO Corporation).

A case where the light transmittance was 97% or more was evaluated as "A" (Acceptable), a case where the light transmittance was 95% or more and less than 97% was evaluated as "B" (Fair), and a case where the light transmittance was less than 95% was evaluated as "C" (Unacceptable).

The evaluation results are shown in Tables 3-1 and 3-2.
Measurement of Relative Permittivity Each of the resin compositions III-1 to III-25 and III-r1 to III-r9 was spin-coated onto a silicon wafer, and prebaked at 100° C. for 2 minutes using a hot plate to obtain a resin film having a thickness of 0.12 µm. The resin film was baked at 230° C. for 1 hour in a nitrogen atmosphere to obtain a sample (i.e., the silicon wafer on which the resin film was formed). The relative permittivity of the resin film was measured at 10 KHz (room temperature) in accordance with JIS C 6481. It is preferable that the relative permittivity of the resin film be as low as possible.

A case where the relative permittivity was less than 2.6 was evaluated as "A" (Acceptable), a case where the relative permittivity was 2.6 or more and less than 2.8 was evaluated as "B" (Fair), and a case where the relative permittivity was 2.8 or more was evaluated as "C" (Unacceptable).

The evaluation results are shown in Tables 3-1 and 3-2.
Measurement of Chemical Resistance Each of the resin compositions III-1 to III-25 and III-r1 to III-r9 was spin-coated onto a silicon wafer, and prebaked at 100° C. for 2 minutes using a hot plate to obtain a resin film having a thickness of 3.0 µm. The resin film was baked at 230° C. for 1 hour in a nitrogen atmosphere to obtain a sample (samples III-1 to III-25 and III-r1 to III-r9) (i.e., the silicon wafer on which the resin film was formed). The sample was immersed in a stripper (50° C.) ("ST-106" manufactured by Tokyo Ohka Kogyo Co., Ltd.) for 1 minute, washed with purified water for 10 seconds, and dried by blowing air, and a change in thickness was measured. It is preferable that the change in thickness be as close to 100% as possible.

A case where the chemical resistance was less than 107% was evaluated as "A" (Acceptable), a case where the chemical resistance was 107% or more and less than 110% was evaluated as "B" (Fair), and a case where the chemical resistance was 110% or more was evaluated, as "C" (Unacceptable).

The evaluation results are shown in Tables 3-1 and 3-2.
Measurement of Plasma Resistance Each of the samples III-1 to III-25 and III-r1 to III-r9 obtained as described above was treated with plasma (argon flow rate: 300 sccm, RF output: 300 W) at room temperature for 10 seconds using a sputtering apparatus "i-Miller (CFS-4EP-LL)" (manufactured by Shibaura Eletec Corporation). A change in thickness was then measured. It is preferable that the change in thickness be as close to 100% as possible.

A case where the plasma resistance was 94% or more was evaluated as "A" (Acceptable), a case where the plasma resistance was 90% or more and less than 94% was evaluated as "B" (Fair), and a case where the plasma resistance was less than 90% was evaluated as "C" (Unacceptable).

The evaluation results are shown in Tables 3-1 and 3-2.

TABLE 3-1

| | Example | | | | | | | | | | | | |
|---|---|---|---|---|---|---|---|---|---|---|---|---|---|
| | III-1 | III-2 | III-3 | III-4 | III-5 | III-6 | III-7 | III-8 | III-9 | III-10 | III-11 | III-12 | III-13 |
| Catalyst | III-A1 | III-A1 | III-A1 | III-A1 | III-A1 | III-A1 | III-A1 | III-A1 | III-A1 | III-A1 | III-A1 | III-A1 | III-A1 |
| Monomer III-1 | 70 | 50 | 70 | 50 | 70 | 50 | 60 | | | | | | |
| (parts by III-2 | | | | | | | | 60 | 60 | 60 | | | |
| weight) III-3 | | | | | | | | | | | 60 | 60 | 60 |
| III-4 | 30 | 50 | | | | | | | 40 | | | 40 | |
| III-5 | | | 30 | 50 | | | | 40 | | | 40 | | |
| III-6 | | | | | 30 | 50 | 40 | | | 40 | | | 40 |
| Hydrogenated polymer | III-1 | III-2 | III-3 | III-4 | III-5 | III-6 | III-7 | III-8 | III-9 | III-10 | III-11 | III-12 | III-13 |
| Light transmittance | C | B | B | A | A | A | A | B | A | A | B | A | A |
| Relative permittivity | A | A | A | B | A | A | A | A | B | A | A | B | B |
| Chemical resistance | A | A | B | A | A | A | A | A | A | A | A | A | A |
| Plasma resistance | A | A | A | A | A | A | A | A | A | A | A | B | B |

| | Example | | | | | | | | | | | |
|---|---|---|---|---|---|---|---|---|---|---|---|---|
| | III-14 | III-15 | III-16 | III-17 | III-18 | III-19 | III-20 | III-21 | III-22 | III-23 | III-24 | III-25 |
| Catalyst | III-A2 | III-A2 | III-A2 | III-A2 | III-A2 | III-A2 | III-A3 | III-A3 | III-A3 | III-A3 | III-A3 | III-A3 |
| Monomer III-1 | 70 | 50 | 70 | 50 | 70 | 50 | 70 | 50 | 70 | 50 | 70 | 50 |
| (parts by III-2 | | | | | | | | | | | | |
| weight) III-3 | | | | | | | | | | | | |
| III-4 | 30 | 50 | | | | | 30 | 50 | | | | |
| III-5 | | | 30 | 50 | | | | | 30 | 50 | | |
| III-6 | | | | | 30 | 50 | | | | | 30 | 50 |
| Hydrogenated polymer | III-14 | III-15 | III-16 | III-17 | III-18 | III-19 | III-20 | III-21 | III-22 | III-23 | III-24 | III-25 |
| Light transmittance | A | B | B | B | A | A | B | B | A | B | A | A |
| Relative permittivity | A | B | B | B | A | A | B | B | B | B | A | A |
| Chemical resistance | A | A | B | A | A | A | B | A | A | A | A | A |
| Plasma resistance | A | A | A | A | A | A | A | B | B | B | A | A |

| | Comparative Example | | | | | | | | |
|---|---|---|---|---|---|---|---|---|---|
| | 1 | 2 | 3 | 4 | 5 | 6 | 7 | 8 | 9 |
| Catalyst | III-X1 | III-X1 | III-X1 | III-X2 | III-X2 | III-X2 | III-X3 | III-X3 | III-X3 |
| Monomer III-1 | 60 | 60 | 60 | 60 | 60 | 60 | 60 | 60 | 60 |
| (parts by III-2 | | | | | | | | | |
| weight) III-3 | | | | | | | | | |
| III-4 | 40 | | | 40 | | | 40 | | |
| III-5 | | 40 | | | 40 | | | 40 | |
| III-6 | | | 40 | | | 40 | | | 40 |
| Hydrogenated polymer | III-r1 | III-r2 | III-r3 | III-r4 | III-r5 | III-r6 | III-r7 | III-r8 | III-r9 |
| Light transmittance | C | C | B | C | C | B | C | C | B |
| Relative permantivity | C | C | C | B | C | C | C | C | B |
| Chemical resistance | C | C | B | C | C | C | C | C | B |
| Plasma resistance | B | B | C | C | C | B | C | C | C |

As is clear from the results shown in Tables 3-1 and 3-2, the hydrogenated polymers III-1 to III-25 of the examples that were obtained by subjecting the cyclic olefin to ring-opening polymerization using the ruthenium compound represented by the formula (III) as the polymerization catalyst, and hydrogenating the resulting ring-opening polymer, exhibited a light transmittance (wavelength: 400 nm), relative permittivity, chemical resistance, and plasma resistance equal to or better than those of the hydrogenated polymers III-r1 to III-r9 of the comparative examples.

(4) Examples in which Ruthenium Compound (IV) was Used as Polymerization Catalyst Example IV-1

A pressure-resistant glass reactor in which the internal atmosphere had been replaced with nitrogen, was charged with 70 parts of 4-hydroxycarbonyltetracyclo[6.2.1.1$^{3,6}$.0$^{2,7}$]dodec-9-ene (TCDC), 30 parts of N-(2-ethylhexyl)bicyclo[2.2.1]hept-5-ene-2,3-dicarboxyimide, 2.5 parts of 1,5-hexadiene, 0.1 parts of ((1-aza-2-oxocyclopentyl)methylene)(1,3-dimesityl-4-imidazolin-2-ylidene)(tricyclohexylphosphine)ruthenium dichloride, and 300 parts of diethylene glycol ethyl methyl ether. The mixture was stirred at 80° C. for 3 hours to obtain a polymerization solution including a ring-opening polymer IV-1.

An autoclave was charged with the polymerization solution, and the polymerization solution was stirred at 150° C. for 1 hour under a hydrogen pressure of 4 MPa to effect a hydrogenation reaction. The resulting solution was filtered through a tunnel precoated with Radiolite to obtain 101 parts of a hydrogenated ring-opening polymer IV-1.

Examples IV-2 to IV-19 and Comparative Examples IV-1 to IV-9

Hydrogenated ring-opening polymers IV-2 to IV-19 and IV-r1 to IV-r9 were obtained in the same manner as in Example IV-1, except that the monomer and the catalyst were changed as shown in Tables 4-1 and 4-2.

Monomer (IV-1): 4-hydroxycarbonyltetracyclo[6.2.1.1$^{3,6}$.0$^{2,7}$]dodec-9-ene Monomer (IV-2): 4-methyl-4-hydroxycarbonyltetracyclo[6.2.1.1$^{3,6}$.0$^{2,7}$]dodec-9-ene Monomer (IV-3): 2,3-dihydroxycarbonylbicyclo[2.2.1]hept-5-ene (corresponding to 5,6-dicarboxynorbornene)

Monomer (IV-4): N-(2-ethylhexyl)bicyclo[2.2.1]hept-5-ene-2,3-dicarboxyimide

Monomer (IV-5): methyl N-(endo-bicyclo[2.2.1]hept-5-ene-2,3-diyldicarbonyl)aspartate Monomer (IV-6): N-phenylbicyclo[2.2.1]hept-5-ene-2,3-dicarboxyimide Catalyst (IV-A1): ((1-aza-2-oxocyclopentyl)methylene)(1,3-dimesityl-4-imidazolin-2-ylidene)(tricyclohexylphosphine)ruthenium dichloride (see Organometallics, Vol. 21, No. 11, 2153-2164. (2002) (Compound No. 14))

Catalyst (IV-A2): ((9H-carbazol-9-yl)methylene)(1,3-dimesityl-4-imidazolin-2-ylidene) (tricyclohexylphosphine) ruthenium dichloride (see Organometallics, Vol. 21, No. 11, 2153-2164. (2002))

Catalyst (IV-X1): (3-phenylinden-1-ylidene)(1,3-dimesityl-4-imidazolin-2-ylidene) (tricyclohexylphosphine)ruthenium dichloride (synthesized using the method described in Organometallics, Vol. 18, p. 5416, 1999)

Catalyst (IV-X2): (2-thienylmethylene)(1,3-dimesityl-4-imidazolin-2-ylidene) (tricyclohexylphosphine)ruthenium dichloride (synthesized using the method described in JP-T2011-516526)

Catalyst (IV-X3): (2-thienylmethylene)(1,3-dimesityl-4,5-dimethyl-4-imidazolin-2-ylidene)(tricyclohexylphosphine) ruthenium dichloride (synthesized using the method described in JP-T2011-516526)

The polymerization conversion rate of the hydrogenated ring-opening polymers IV-1 to IV-19 and IV-r1 to IV-r9 was 90.0% or more. The hydrogenated ring-opening polymers IV-1 to IV-19 and IV-r1 to IV-r9 had a weight average molecular weight (Mw) of 5000 to 7000, a number average molecular weight (Mn) of 3000 to 5000, a molecular weight distribution (Mw/Mn) of 1.0 to 2.3, and a hydrogenation rate of 90% or more.

Preparation of Resin Composition

The hydrogenated ring-opening polymers IV-1 to IV-19 and IV-r1 to IV-r9 obtained in the examples and the comparative examples were diluted with diethylene glycol ethyl methyl ether to obtain resin compositions IV-1 to IV-19 and IV-r1 to IV-r9 (solid content: 20%), respectively.

Measurement of Light Transmittance

Each of the resin compositions IV-1, to IV-19 and IV-r1 to IV-r9 was spin-coated onto a glass substrate ("Corning 1737" manufactured by Corning Incorporated), and prebaked at 90° C. for 2 minutes using a hot plate to obtain a resin film having a thickness of 3.0 μm. The resin film was baked at 230° C. for 1 hour in an oven (atmosphere: nitrogen) to obtain a laminate. The light transmittance (wavelength: 400 nm) of the laminate was measured using a spectrophotometer ("V-560" manufactured by JASCO Corporation).

A case where the light transmittance was 97% or more was evaluated as "A" (Acceptable), a case where the light transmittance was 95% or more and less than 97% was evaluated as "B" (Fair), and a case where the light transmittance was less than 95% was evaluated as "C" (Unacceptable).

The evaluation results are shown in Tables 4-1 and 4-2.

Measurement of Relative Permittivity

Each of the resin compositions IV-1 to IV-19 and IV-r1 to IV-r9 was spin-coated onto a silicon wafer, and prebaked at 100° C. for 2 minutes using a hot plate to obtain a resin film having a thickness of 0.12 μm. The resin film was baked at 230° C. for 1 hour in a nitrogen atmosphere to obtain a sample (i.e., the silicon wafer on which the resin film was formed). The relative permittivity of the resin film was measured at 10 KHz (room temperature) in accordance with JIS C 6481. It is preferable that the relative permittivity of the resin film be as low as possible.

A case where the relative permittivity was less than 2.6 was evaluated as "A" (Acceptable), a case where the relative permittivity was 2.6 or more and less than 2.8 was evaluated as "B" (Fair), and a case where the relative permittivity was 2.8 or more was evaluated as "C" (Unacceptable).

The evaluation results are shown in Tables 4-1 and 4-2.

Measurement of Chemical Resistance

Each of the resin compositions IV-1 to IV-19 and IV-r1 to IV-r9 was spin-coated onto a silicon wafer, and prebaked at 100° C. for 2 minutes using a hot plate to obtain a resin film having a thickness of 3.0 μm. The resin film was baked at 230° C. for 1 hour in a nitrogen atmosphere to obtain a sample (samples 1 to 19 and r1 to r9) (i.e., the silicon wafer on which the resin film was formed). The sample was immersed in a stripper (50° C.) ("ST-106" manufactured by Tokyo Ohka Kogyo Co., Ltd.) for 1 minute, washed with purified water for 10 seconds, and dried by blowing air, and a change in thickness was measured. It is preferable that the change in thickness be as close to 100% as possible.

A case where the chemical resistance was less than 107% was evaluated as "A" (Acceptable), a case where the chemical resistance was 107% or more and less than 110% was evaluated as "B" (Fair), and a case where the chemical resistance was 110% or more was evaluated as "C" (Unacceptable).

The evaluation results are shown in Tables 4-1 and 4-2.

Measurement of Plasma Resistance

Each of the samples IV-1 to IV-19 and IV-r1 to IV-r9 obtained as described above was treated with plasma (argon flow rate: 300 sccm, RF output: 300 W) at room temperature for 10 seconds using a sputtering apparatus "i-Miller (CFS-4EP-LL)" (manufactured by Shibaura Eletec Corporation). A change in thickness was then measured. It is preferable that the change in thickness be as close to 100% as possible.

A case where the plasma resistance was 94% or more was evaluated as "A" (Acceptable), a case where the plasma resistance was 90% or more and less than 94% was evaluated as "B" (Fair), and a case where the plasma resistance was less than 90% was evaluated as "C" (Unacceptable).

The evaluation results are shown in Tables 4-1 and 4-2.

TABLE 4-1

| | | Example | | | | | | | | | |
|---|---|---|---|---|---|---|---|---|---|---|---|
| | | IV-1 | IV-2 | IV-3 | IV4 | IV-5 | IV-6 | IV-7 | IV-8 | IV-9 | IV-10 |
| Catalyst | | IV-A1 | IV-A1 | IV-A1 | IV-A1 | IV-A1 | IV-A1 | IV-A1 | IV-A1 | IV-A1 | IV-A1 |
| Monomer | IV-1 | 70 | 50 | 70 | 50 | 70 | 50 | 60 | | | |
| (parts by | IV-2 | | | | | | | | 60 | 60 | 60 |
| weight | IV-3 | | | | | | | | | | |
| | IV-4 | 30 | 50 | | | | | | 40 | | |
| | IV-5 | | | 30 | 50 | | | | | 40 | |
| | IV-6 | | | | | 30 | 50 | 40 | | | 40 |
| Hydrogenated polymer | | IV-1 | IV-2 | IV-3 | IV-4 | IV-5 | IV-6 | IV-7 | IV-8 | IV-9 | IV-10 |
| Light transmittance | | A | B | B | B | A | A | A | B | A | B |
| Relative permittivity | | B | A | A | B | A | A | A | A | B | B |
| Chemical resistance | | A | A | A | A | A | A | A | A | A | A |
| Plasma resistance | | A | A | A | A | A | A | A | A | B | A |

| | | Example | | | | | | | | |
|---|---|---|---|---|---|---|---|---|---|---|
| | | IV-11 | IV-12 | IV-13 | IV-14 | IV-15 | IV-16 | IV-17 | IV-18 | IV-19 |
| Catalyst | | IV-A1 | IV-A1 | IV-A1 | IV-A2 | IV-A2 | IV-A2 | IV-A2 | IV-A2 | IV-A2 |
| Monomer | IV-1 | | | | 70 | 50 | 70 | 50 | 70 | 50 |
| (parts by | IV-2 | | | | | | | | | |
| weight) | IV-3 | 60 | 60 | 60 | | | | | | |
| | IV-4 | 40 | | | 30 | 50 | | | | |
| | IV-5 | | 40 | | | | 30 | 50 | | |
| | IV-6 | | | 40 | | | | | 30 | 50 |
| Hydrogenated polymer | | IV-11 | IV-12 | IV-13 | IV-14 | IV-15 | IV-16 | IV-17 | IV-18 | IV-19 |
| Light resistance | | A | A | A | B | B | B | B | A | A |
| Relative permittivity | | A | B | B | A | B | B | B | A | A |
| Chemical resistance | | A | B | B | A | A | B | A | A | A |
| Plasma resistance | | A | B | B | A | A | A | A | A | A |

TABLE 4-2

| | | Comparative Example | | | | | | | | |
|---|---|---|---|---|---|---|---|---|---|---|
| | | IV-1 | IV-2 | IV-3 | IV-4 | IV-5 | IV-6 | IV-7 | IV-8 | IV-9 |
| Catalyst | | IV-X1 | IV-X1 | IV-X1 | IV-X2 | IV-X2 | IV-X2 | IV-X2 | IV-X2 | IV-X2 |
| Monomer | IV-1 | 60 | 60 | 60 | 60 | 60 | 60 | 60 | 60 | 60 |
| (parts by | IV-2 | | | | | | | | | |
| weight) | IV-3 | | | | | | | | | |
| | IV-4 | 40 | | | 40 | | | 40 | | |
| | IV-5 | | 40 | | | 40 | | | 40 | |
| | IV-6 | | | 40 | | | 40 | | | 40 |
| Hydrogenated polymer | | IV-r1 | IV-r2 | IV-r3 | IV-r4 | IV-r5 | IV-r6 | IV-r7 | IV-r8 | IV-r9 |
| Light transmittance | | C | C | B | C | C | B | C | C | B |
| Relative permittivity | | C | C | C | B | C | C | C | C | B |
| Chemical resistance | | C | C | B | C | C | C | C | C | B |
| Plasma resistance | | B | B | C | C | C | B | C | C | C |

As is clear from the results shown in Tables 4-1 and 4-2, the hydrogenated polymers IV-1 to IV-19 of the examples that were obtained by subjecting the cyclic olefin to ring-opening polymerization using the ruthenium compound represented by the formula (IV) as the polymerization catalyst, and hydrogenating the resulting ring-opening polymer, exhibited a light transmittance (wavelength: 400 nm), relative permittivity, chemical resistance, and plasma resistance equal to or better than those of the hydrogenated polymers IV-r1 to IV-r9 of the comparative examples.

The invention claimed is:
1. A method for producing a hydrogenated ring-opening metathesis polymer comprising
    subjecting a cyclic olefin to ring-opening metathesis polymerization in the presence of a polymerization catalyst to produce a ring-opening metathesis polymer, and hydrogenating at least some of carbon-carbon double bonds of the ring-opening metathesis polymer, the cyclic olefin comprising:
    (i) a monomer represented by the following formula (2),

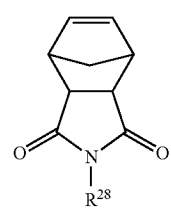

(2)

wherein $R^{28}$ is a $C_1$-$C_{20}$ alkyl group, a $C_3$-$C_{20}$ cycloalkyl group, a substituted or unsubstituted $C_6$-$C_{20}$ aryl group, or a group represented by the following formula (3),

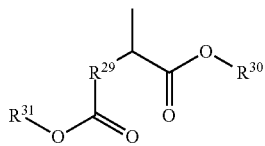

(3)

wherein $R^{29}$ is a $C_1$-$C_3$ alkylene group, and $R^{30}$ and $R^{31}$ are independently a $C_1$-$C_{10}$ alkyl group or a $C_1$-$C_{10}$ alkyl halide group, and (ii) a cyclic olefin that includes a protonic polar group, the proportion of the cyclic olefin including a protonic polar group being 10-90 mol % based on the total cyclic olefins, the polymerization catalyst being a ruthenium compound shown by the following formula (I),

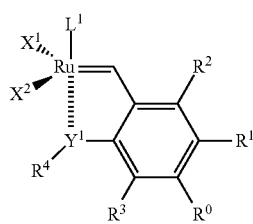

(I)

wherein $X^1$ and $X^2$ are independently a halogen atom;

$L^1$ represents a group represented by any of the following formulas (1-1) to (1-3),

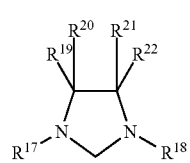

(1-1)

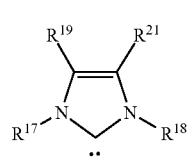

(1-2)

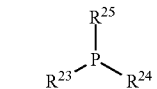

(1-3)

wherein $R^{17}$ and $R^{18}$ are independently a phenyl group, 4-methylphenyl group, 2,4-dimethylphenyl group, 2,4,6-trimethylphenyl group, biphenyl group, 1-naphthyl group, 2-naphthyl group, or methylnaphthyl group, $R^{19}$ to $R^{22}$ are independently a hydrogen atom or a $C_1$-$C_{10}$ alkyl group, and $R^{23}$ to $R^{25}$ are independently a $C_1$-$C_{20}$ alkyl group, a $C_1$-$C_{20}$ alkoxy group, a $C_3$-$C_{20}$ cycloalkyl group, a $C_6$-$C_{20}$ aryl group, which may be substituted with a halogen atom, a $C_1$-$C_6$ alkyl group, a $C_1$-$C_6$ alkoxy group, a nitro group, or a cyano group, a $C_6$-$C_{20}$ aryloxy group, which may be substituted with a halogen atom, a $C_1$-$C_6$ alkyl group, a $C_1$-$C_6$ alkoxy group, a nitro group, or a cyano group, or a $C_2$-$C_{20}$ heterocyclic group, which may be substituted with a halogen atom, a $C_1$-$C_6$ alkyl group, a $C_1$-$C_6$ alkoxy group, a nitro group, or a cyano group;

$R^0$ is a hydrogen atom, a halogen atom, a nitro group, a cyano group, a $C_1$-$C_{20}$ alkyl group, a $C_1$-$C_{20}$ alkoxy group, a $C_1$-$C_{20}$ alkylthio group, a tri-$C_1$-$C_{20}$ alkylsilyl group, a tri-$C_1$-$C_{20}$ alkylsilyloxy group, a $C_6$-$C_{20}$ aryl group, which may be substituted with a halogen atom, a $C_1$-$C_6$ alkyl group, a $C_1$-$C_6$ alkoxy group, a nitro group, or a cyano group, a $C_6$-$C_{20}$ aryloxy group, which may be substituted with a halogen atom, a $C_1$-$C_6$ alkyl group, a $C_1$-$C_6$ alkoxy group, a nitro group, or a cyano group, a $C_2$-$C_{20}$ heterocyclic group, which may be substituted with a halogen atom, a $C_1$-$C_6$ alkyl group, a $C_1$-$C_6$ alkoxy group, a nitro group, or a cyano group, a $C_1$-$C_{20}$ alkylsulfonyl group, a $C_1$-$C_{20}$ alkylsulfinyl group, a formyl group, a $C_1$-$C_{20}$ alkylcarbonyl group, a $C_1$-$C_{20}$ alkoxycarbonyl group, a di-$C_1$-$C_{20}$ alkylcarbamoyl group, a di-$C_1$-$C_{20}$ alkylureido group, or a di-$C_1$-$C_{20}$ alkylsulfonylamino group;

$R^1$ is a group represented by $(R^{b1})(R^{b2})NSO_2$—, a formyl group, a $C_1$-$C_{20}$ alkylcarbonyl group, a $C_1$-$C_{20}$ alkoxycarbonyl group, a group represented by $(R^{c1})(R^{c2})NCO$—, an amide group, a halogen atom, a di-$C_1$-$C_{20}$ alkylureido group, or a $C_1$-$C_{20}$ alkylsulfonylamino group, wherein $R^{b1}$ and $R^{c1}$ are a hydrogen atom, a $C_1$-$C_{20}$ alkyl group, or an aryl group, which may be substituted with a halogen atom a $C_1$-$C_6$ alkyl group, $C_1$-$C_{16}$ alkoxy group, a nitro group, or a cyano group, and $R^{b2}$ and $R^{c2}$ are a hydrogen atom, a $C_1$-$C_{20}$ alkyl group, or an aryl group, which may be substituted with a halogen atom a $C_1$-$C_6$ alkyl group, $C_1$-$C_{16}$ alkoxy group, a nitro group, or a cyano group, provided that $R^{b1}$ and $R^{b2}$ or $R^{c1}$ and $R^{c2}$ optionally bond to each other to form a ring;

$R^2$ and $R^3$ are independently a hydrogen atom, a halogen atom, a $C_1$-$C_{20}$ alkyl group, a $C_1$-$C_{20}$ alkoxy group, a $C_1$-$C_{20}$ alkylthio group, a tri-$C_1$-$C_{20}$ alkylsilyloxy group, a $C_6$-$C_{20}$ aryloxy group, a $C_6$-$C_{20}$ aryl group, a $C_2$-$C_{20}$ heterocyclic group, a $C_1$-$C_{20}$ alkoxycarbonyl group, a di-$C_1$-$C_{20}$ alkylcarbamoyl group, a di-$C_1$-$C_{20}$ alkylureido group, or a $C_1$-$C_{20}$ alkylsulfonylamino group;

$R^4$ is
a hydrogen atom,
a $C_1$-$C_{20}$ alkyl group,
a $C_1$-$C_{20}$ alkoxy group,
a $C_1$-$C_{20}$ alkylthio group,
a tri-$C_1$-$C_{20}$ alkylsilyl group,
a tri-$C_1$-$C_{20}$ alkylsilyloxy group,
a $C_6$-$C_{20}$ aryl group, which may be substituted with a halogen atom, $C_1$-$C_6$ alkyl group, a $C_1$-$C_6$ alkoxy group, a nitro group, or a cyano group,
a $C_6$-$C_{20}$ aryloxy group, which may be substituted with a halogen atom, $C_1$-$C_6$ alkyl group, $C_1$-$C_6$ alkoxy group, a nitro group, or a cyano group, or
a $C_2$-$C_{20}$ heterocyclic group, which may be substituted with a halogen atom, a $C_1$-$C_6$ alkyl group, a $C_1$-$C_6$ alkoxy group, a nitro group, or a cyano group,
a $C_1$-$C_{20}$ alkylsulfonyl group,
a $C_1$-$C_{20}$ alkylsulfinyl group,
a $C_1$-$C_{20}$ alkylcarbonyl group,
a $C_1$-$C_{20}$ alkoxycarbonyl group,
a di-$C_1$-$C_{20}$ alkylcarbamoyl group,
a di-$C_1$-$C_{20}$ alkylureido group,
a $C_1$-$C_{20}$ alkylsulfonylamino group, or
a $C_6$-$C_{20}$ arylcarbonyl group that is optionally substituted with a halogen atom; and $Y^1$ is an oxygen atom, a sulfur atom, $NR^b$, or $PR^b$, where $R^b$ is a hydrogen atom or a $C_1$-$C_{20}$ alkyl group; wherein the reaction of polymerizing the cyclic olefin by ring-opening metathesis polymerization is conducted in the presence of the polymerization catalyst in an ether-based solvent wherein the ether-based solvent is present in an amount of 0.5-100 parts by weight per one part by weight of the cyclic olefin.

2. The method according to claim 1, wherein at least 98% of the carbon-carbon double bonds of the ring-opening metathesis polymer are hydrogenated.

3. The method according to claim 1, wherein the ruthenium compound represented by the formula (I) is a compound represented by a formula (I-2),

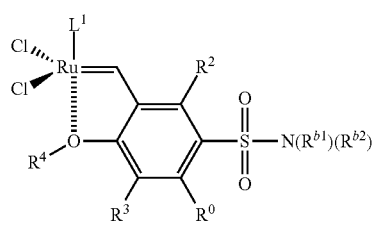

(I-2)

wherein $L^1$, $R^0$, $R^2$ to $R^4$, $R^{b1}$, and $R^{b2}$ are the same as defined in claim 1.

4. The method according to claim 1, wherein the ruthenium compound represented by the formula (I) is a compound represented by a formula (I-3),

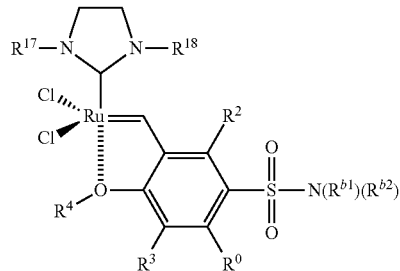

(I-3)

wherein $R^0$, $R^2$ to $R^4$, $R^{17}$, $R^{18}$, $R^{b1}$, and $R^{b2}$ are the same as defined in claim 1.

5. The method according to claim 1, wherein the ruthenium compound represented by the formula (I) is a compound represented by a formula (I-4),

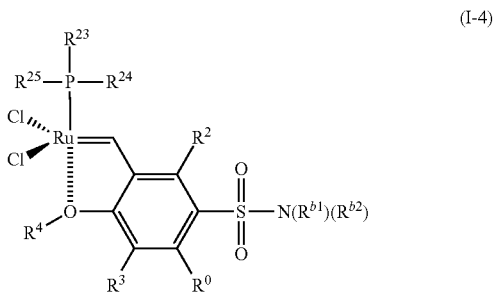

(I-4)

wherein $R^0$, $R^2$ to $R^4$, $R^{23}$ to $R^{25}$, $R^{b1}$, and $R^{b2}$ are the same as defined in claim 1.

6. A method according to claim 5, wherein the metathesis polymerization of the cyclic olefin is conducted in the presence of the polymerization catalyst in an ether solvent by a solution polymerization.

7. The method according to claim 2, wherein the ruthenium compound represented by the formula (I) is a compound represented by a formula (I-2),

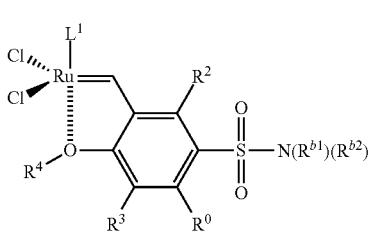

(I-2)

wherein $L^1$, $R^0$, $R^2$ to $R^4$, $R^{b1}$, and $R^{b2}$ are the same as that defined for the ruthenium compound represented by the formula (I).

8. The method according to claim 2, wherein the ruthenium compound represented by the formula (I) is a compound represented by a formula (I-3),

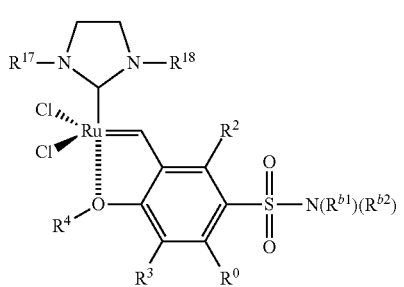
(I-3)

wherein $R^0$, $R^2$ to $R^4$, $R^{17}$, $R^{18}$, $R^{b1}$, and $R^{b2}$ are the same as that defined for the ruthenium compound represented by the formula (I).

9. The method according to claim 2, wherein the ruthenium compound represented by the formula (I) is a compound represented by a formula (I-4),

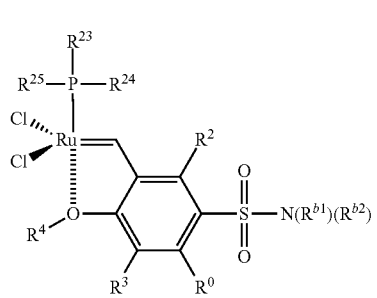
(I-4)

wherein $R^0$, $R^2$ to $R^4$, $R^{23}$ to $R^{25}$, $R^{b1}$, and $R^{b2}$ are the same as that defined for the ruthenium compound represented by the formula (I).

* * * * *